(12) United States Patent
Araki et al.

(10) Patent No.: US 11,202,074 B2
(45) Date of Patent: Dec. 14, 2021

(54) ENCODING APPARATUS AND ENCODING METHOD

(71) Applicant: SONY CORPORATION, Tokyo (JP)

(72) Inventors: Yuichi Araki, Tokyo (JP); Tsuyoshi Kato, Kanagawa (JP); Koji Yano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 137 days.

(21) Appl. No.: 15/781,283

(22) PCT Filed: Feb. 22, 2017

(86) PCT No.: PCT/JP2017/006457
§ 371 (c)(1),
(2) Date: Jun. 4, 2018

(87) PCT Pub. No.: WO2017/154563
PCT Pub. Date: Sep. 14, 2017

(65) Prior Publication Data
US 2018/0352229 A1    Dec. 6, 2018

(30) Foreign Application Priority Data
Mar. 7, 2016 (JP) .............................. JP2016-043211

(51) Int. Cl.
*H04N 19/127* (2014.01)
*H04N 19/159* (2014.01)
(Continued)

(52) U.S. Cl.
CPC ......... *H04N 19/127* (2014.11); *H04N 19/115* (2014.11); *H04N 19/117* (2014.11);
(Continued)

(58) Field of Classification Search
CPC ...... H04N 19/127; H04N 19/70; H04N 19/85; H04N 19/137; H04N 19/52; H04N 19/124;
(Continued)

(56) References Cited

U.S. PATENT DOCUMENTS

2009/0034856 A1*  2/2009  Moriya .................. G06T 9/004
                                                         382/238
2010/0034508 A1*  2/2010  Morimoto .......... G11B 20/1217
                                                         386/283
(Continued)

FOREIGN PATENT DOCUMENTS

JP    2006-243324 A     9/2006
JP    2007-312415 A    11/2007
(Continued)

OTHER PUBLICATIONS

English translation of JP 2006-243324A, Image Transmission System and Image Transmission Method, Applicants: Matsushita Electric Ind Co Ltd Inventors: Maeda Tsuyoshi, Watanabe Takashi, Publication date: Sep. 14, 2006 (Year : 2006).*

(Continued)

*Primary Examiner* — Joseph G Ustaris
*Assistant Examiner* — Jill D Sechser
(74) *Attorney, Agent, or Firm* — Paratus Law Group, PLLC

(57) ABSTRACT

There is provided an encoding apparatus and an encoding method that make it possible to generate an encoded stream from which an image of a low load and high picture quality can be decoded. An arithmetic operation section or the like divides an image into a plurality of AUs and encodes the AUs to generate encoded streams of the plurality of AUs. A setting section sets 0 as pic_output_flag indicating that a decoded image obtained by decoding an encoded stream of (Continued)

an AU other than the last division AU from among the encoded streams of the plurality of AUs generated by the arithmetic operation section or the like is not to be displayed. The present disclosure can be applied, for example, to an encoding apparatus and so forth.

12 Claims, 30 Drawing Sheets

(51) Int. Cl.
  *H04N 19/172* (2014.01)
  *H04N 19/115* (2014.01)
  *H04N 19/137* (2014.01)
  *H04N 19/85* (2014.01)
  *H04N 19/70* (2014.01)
  *H04N 19/117* (2014.01)
  *H04N 19/124* (2014.01)
  *H04N 19/52* (2014.01)
(52) U.S. Cl.
  CPC ......... *H04N 19/124* (2014.11); *H04N 19/137* (2014.11); *H04N 19/159* (2014.11); *H04N 19/172* (2014.11); *H04N 19/52* (2014.11); *H04N 19/70* (2014.11); *H04N 19/85* (2014.11)
(58) Field of Classification Search
  CPC .. H04N 19/117; H04N 19/115; H04N 19/172; H04N 19/159
  See application file for complete search history.

(56) References Cited

U.S. PATENT DOCUMENTS

| | | | |
|---|---|---|---|
| 2010/0046609 A1* | 2/2010 | Toma | H04N 5/7605 375/240.01 |
| 2011/0182348 A1 | 7/2011 | Lin et al. | |
| 2015/0319435 A1* | 11/2015 | Lim, II | H04N 19/174 382/233 |
| 2016/0080752 A1* | 3/2016 | Oh | H04N 19/30 375/240.12 |
| 2017/0105023 A1* | 4/2017 | Marchya | H04N 19/107 |
| 2019/0297339 A1* | 9/2019 | Hannuksela | H04N 19/59 |

FOREIGN PATENT DOCUMENTS

| | | |
|---|---|---|
| JP | 2013-132048 A | 7/2013 |
| JP | 2015-216638 A | 12/2015 |
| WO | WO 2012/017643 A1 | 2/2012 |

OTHER PUBLICATIONS

Jan. 31, 2019, European Search Report issued for related EP Application No. 17762905.2.

Shishikui et al., High-Performance Video Codec for Super Hi-Vision, Proceedings of the IEEE, Aug. 10, 2012, pp. 130-139, vol. 101, Issue 1, IEEE.

Bross et al., High Efficiency Video Coding (HEVC) text specification draft 7, Joint Collaborative Team on Video Coding (JCT-VC) of ITU-T SG16 WP3 and ISO/IEC JTC1/SC29/WG11, Apr. 27-May 7, 2012, pp. 1-252, 9th Meeting, Geneva, CH.

ITU-T, Advanced video coding for generic audiovisual services, Series H: Audiovisual and Multimedia Systems, Infrastructure of audiovisual services—Coding of moving video, Recommendation ITU-T H.264, Jan. 2012, pp. 1-657, International Telecommunication Union.

Bross et al., High Efficiency Video Coding (HEVC) text specification draft 10 (for FDIS & Last Call), Joint Collaborative Team on Video Coding (JCT-VC) of ITU-T SG 16 WP 3 and ISO/IEC JTC 1/SC 29/WG 11, Jan. 14-23, 2013, pp. 1-310, 12$^{th}$ Meeting: Geneva, CH.

* cited by examiner

FIG. 4

| au_idx | 3 | 4 | 5 | 6 | 7 | 8 | 9 | 10 |
|---|---|---|---|---|---|---|---|---|
| frame_idx | 3 | 4 | 5 | 6 | 7 | 7 | 7 | 7 |
| au_divide_flag | 0 | 0 | 0 | 0 | 1 | 1 | 1 | 1 |
| au_divide_idx | — | — | — | — | 0 | 1 | 2 | 3 |
| au_divide_num | — | — | — | — | 4 | 4 | 4 | 4 |
| coded_flag | 0 | 0 | 0 | 0 | 0 | 0 | 0 | 0 |

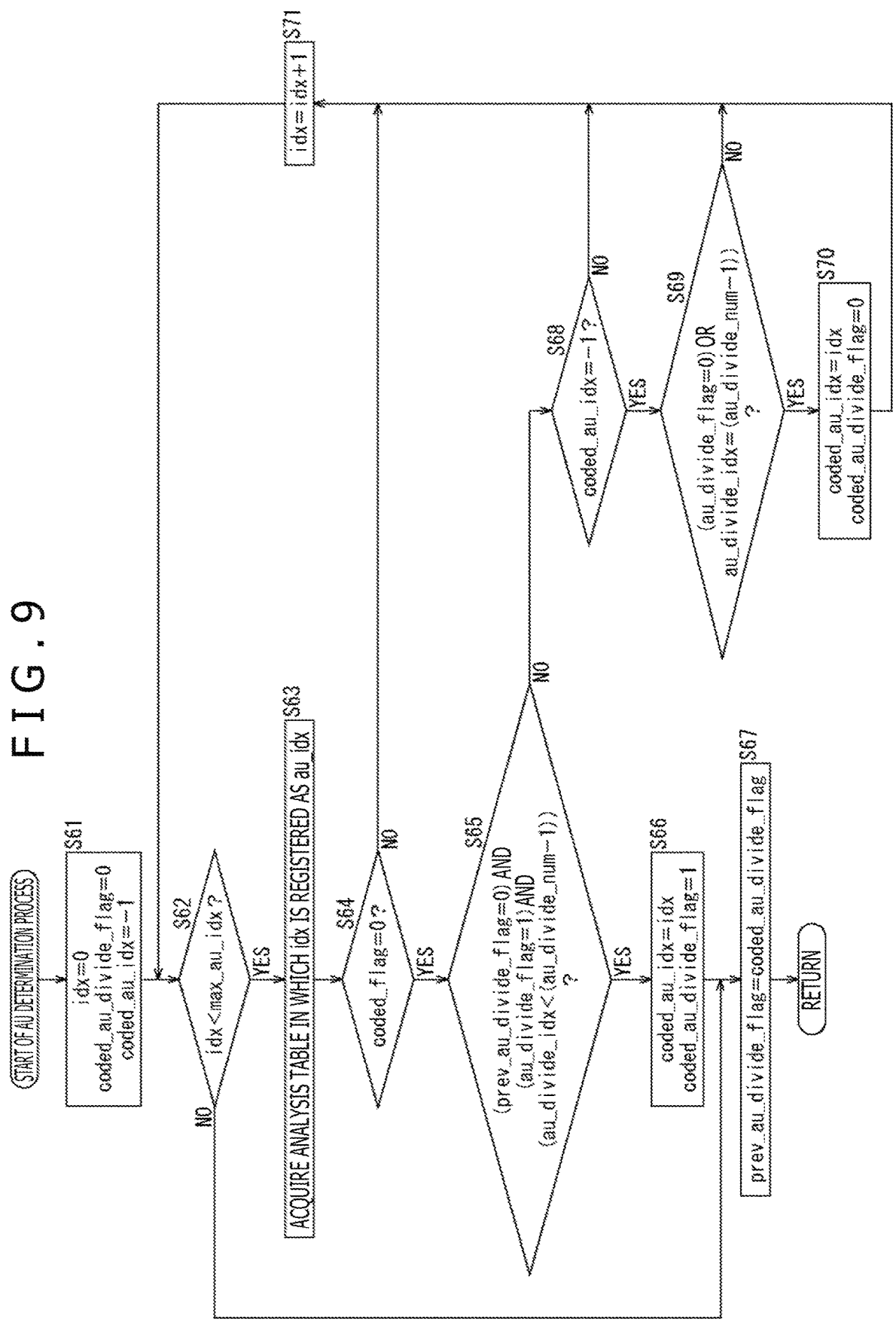
F I G . 9

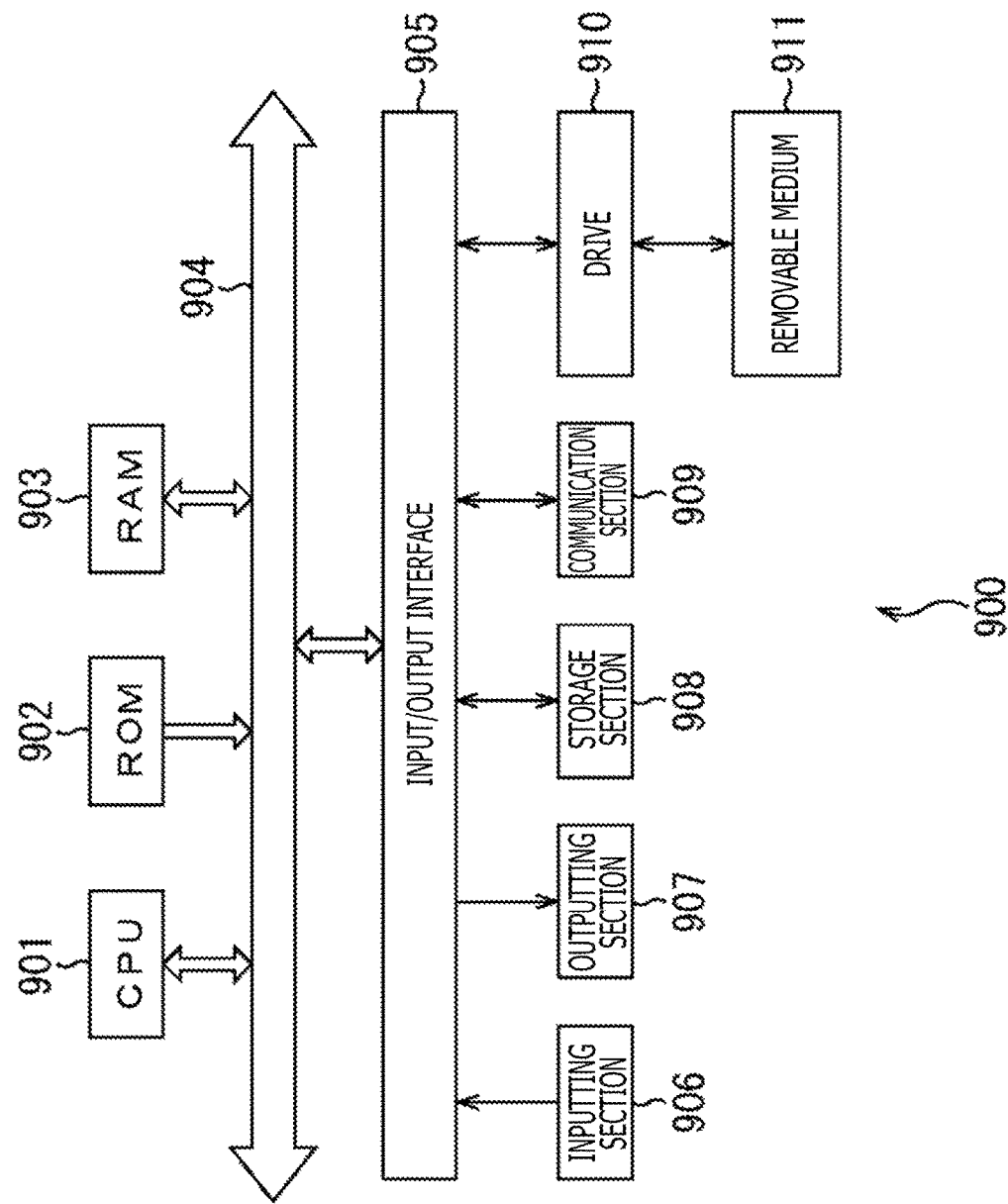

ENCODING APPARATUS AND ENCODING METHOD

CROSS REFERENCE TO PRIOR APPLICATION

This application is a National Stage Patent Application of PCT International Patent Application No. PCT/JP2017/006457 (filed on Feb. 22, 2017) under 35 U.S.C. § 371, which claims priority to Japanese Patent Application No. 2016-043211 (filed on Mar. 7, 2016), which are all hereby incorporated by reference in their entirety.

TECHNICAL FIELD

The present disclosure relates to an encoding apparatus and an encoding method, and particularly to an encoding apparatus and an encoding method by which an encoded stream from which images of a low load and high picture quality can be decoded can be generated.

BACKGROUND ART

A load on a decoder varies from various factors when a moving picture encoded by the AVC (Advanced Video Coding) method, the HEVC (High Efficiency Video coding) method (for example, refer to NPL 1) or the like is decoded. In the case where resolutions of frames are equal to each other, the factor having a great influence on the load on a decoder generally is a bit generation amount per one frame. For example, the load on a decoder of a frame having a great bit generation amount such as an intra frame that is inserted periodically, a scene change frame with which a scene is changed over or the like is higher than that of the other frames.

Further, if the load on a decoder increases locally in a real time application that involves a decoding process of a moving picture, then the total of the load on the decoder and the load on the other than the decoder sometimes exceeds a marginal load for implementing a real time process. For example, in the case where the load on the decoder increases locally even if the load on the other than the decoder is fixed for each frame, the total of the load on the decoder and the load on the other than the decoder sometimes exceeds the marginal load of a real time process. Accordingly, in such a case as just described, the real time process cannot be guaranteed.

From the foregoing, it is demanded to perform, in encoding of a moving picture by the AVC method, the HEVC method or the like, encoding such that the load on a decoder is leveled. As such a method for encoding as just described, for example, a method for leveling the bit generation amount in individual frames is available.

CITATION LIST

Patent Literature

[NPL 1]
BENJAMIN BROSS; WOO-JIN HAN; JENS-RAINER OHM; GARY J. SULLIVAN; YE-KUI WANG; THOMAS WIEGAND: "High Efficiency Video Coding (HEVC) text specification draft 10 (forFDIS&LastCall)," JCTVC-L1003 V34, JOINT COLLABORATIVE TEAM ON VIDEO CODING (JCT-VC) OF ITU-T SG 16 WP 3 AND ISO/IEC JTC 1/SC 29/WG 11 12TH MEETING: GENEVA, CH, 14 Jan. 2013 (2013 Jan. 14)

SUMMARY

Technical Problem

However, in the case where the bit generation amount is to be leveled among frames, it is necessary to suppress the bit generation amount in an intra frame or a scene change frame by increasing a quantization parameter that is used in encoding or the like. Accordingly, the picture quality of a decoded image degrades.

The present disclosure has been made in view of such a situation as described above and makes it possible to generate an encoded stream from which an image of a low load and high picture quality can be decoded.

Solution to Problem

An encoding apparatus of one aspect of the present disclosure is an encoding apparatus including an encoding section configured to divide an image into a plurality of access units and encode the plurality of access units to generate encoded streams of the plurality of access units, and a setting section configured to set non-display information indicating that a decoded image obtained by decoding an encoded stream of an access unit other than a last access unit from among the encoded streams of the plurality of access units generated by the encoding section is not to be displayed.

An encoding method of the one aspect of the present disclosure corresponds to the encoding apparatus according to the one aspect of the present disclosure.

In the one aspect of the present disclosure, an image is divided into a plurality of access units and encoded to generate encoded streams of the plurality of access units, and non-display information indicating that a decoded image obtained by decoding an encoded stream of an access unit other than a last access unit from among the encoded streams of the plurality of access units is not to be displayed is set.

It is to be noted that the encoding apparatus of the one aspect of the present disclosure can be implemented by causing a computer to execute a program.

Further, the program to be executed by the computer in order to implement the encoding apparatus of the one aspect of the present disclosure can be provided by transmitting the same through a transmission medium or by recording the same on a recording medium.

Advantageous Effects of Invention

According to the one aspect of the present disclosure, encoding can be performed. Further, according to the one aspect of the present disclosure, it is possible to generate an encoded stream from which an image of a low load and high picture quality can be decoded.

It is to be noted that the effects described here are not necessarily restrictive and the effect may be any one of the effects described in the present disclosure.

BRIEF DESCRIPTION OF DRAWINGS

FIG. 4 is a view depicting an example of values registered in the analysis table.

FIG. 9 is a flow chart illustrating an AU determination process of FIG. 7.

FIG. 30 is a block diagram depicting an example of a hardware configuration of a computer.

DESCRIPTION OF EMBODIMENTS

In the following, a mode for carrying out the present disclosure (hereinafter referred to as embodiment) is described. It is to be noted that the description is given in the following order.

1. First Embodiment: Encoding Apparatus (FIGS. 1 to 19)
2. Second Embodiment: Encoding Apparatus (FIGS. 20 to 29)
3. Third Embodiment: Computer (FIG. 30)

First Embodiment (Overview of Encoding Method)

Figure 1:
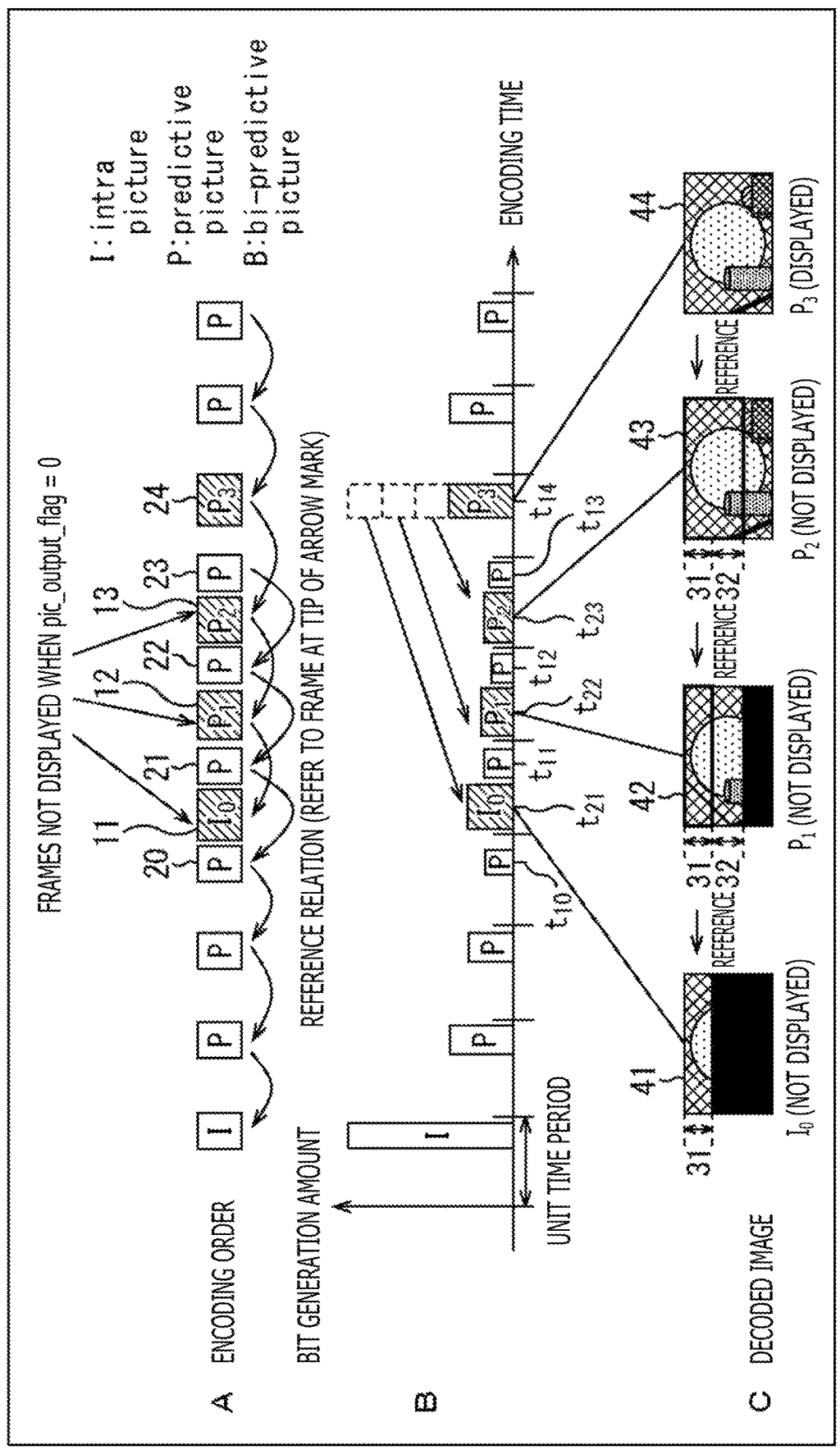
FIG. 1 is a view illustrating an overview of an encoding method according to a first embodiment of an encoding apparatus to which the present disclosure is applied.

FIG. 1 is a view illustrating an overview of an encoding method according to the first embodiment of an encoding apparatus to which the present disclosure is applied.

The encoding method in the first embodiment is an encoding method that complies with the HEVC method.

B of FIG. 1 is a bar graph whose axis of abscissa represents the encoding time and whose axis of ordinate represents the bit generation amount of an encoded stream in a unit of an AU (Access Unit). In each bar in the bar graph, an alphabet (in the example of FIG. 1, I or P) is described which indicates a picture type corresponding to an encoded stream in regard to which the bar represents the bit generation amount. These matters similarly apply also to B of FIG. 20 hereinafter described.

Meanwhile, A of FIG. 1 is a view depicting an encoding order of images of frames by arranging, at positions on the axis of abscissa of B of FIG. 1, quadrangles representative of images of frames, which are to be encoded at points of encoding time represented by the positions on the axis of abscissa. It is to be noted that an alphabet in a quadrangle representative of an image of each frame represents a picture type of the image, and an arrow mark between pictures represents a reference relation. These matters similarly apply also to A of FIG. 20 hereinafter described.

As depicted in A of FIG. 1 and B of FIG. 1, in the encoding method according to the first embodiment, an image of a frame expected to have a large bit generation amount is encoded after it is divided into a plurality of AUs.

In the example of FIG. 1, an image 24 of the eighth frame from the top, which is scheduled to be encoded at encoding time $t_{14}$, is an image of a frame expected to have a great bit generation amount. Accordingly, the image 24 is encoded after it is divided into four AUs.

In particular, the image 24 is divided into three division regions in the vertical direction. Then, a division image 11 is generated which includes the upper division region and in which the region other than the division region indicates a fixed value image (in the example of FIG. 1, a black image) in which the pixel values are a fixed value. The division image 11 is encoded as an I picture at encoding time $t_{21}$ between encoding time $t_{10}$ of the image 20 four frames before the image 24 and encoding time $t_{11}$ of the image 21 three frames before the image 24. By this, an encoded stream of the first AU of the image 24 is generated. At this time, the encoded stream is decoded, and a division decoded image 41 in which the region other than the upper region 31 indicates a fixed value image as depicted in C of FIG. 1 is obtained.

Then, a division image 12 is generated which includes the division regions at the upper portion and the central portion and in which the region other than the division regions indicates a fixed value image. Then, the division image 12 is encoded as a P picture by reference to the division decoded image 41 at encoding time $t_{22}$ between encoding time $t_{11}$ and encoding time $t_{12}$ for the image 22 of the next frame to the image 21. By this, an encoded stream of the second AU of the image 24 is generated. At this time, the encoding mode for the regions other than the division region at the central portion is set to a skip mode in which a motion vector with respect to a reference image and a residual from the reference image are not included in the encoded stream and the pixel value of each pixel of the reference image is made a pixel value of a pixel of a decoded image at the same position as that of the pixel. Accordingly, the decoding result of the encoded stream obtained upon encoding is a division decoded image 42 in which the upper region 31 is same as that of the division decoded image 41 and the region other than the upper region 31 and the region 32 at the central portion indicates a fixed value image as depicted in C of FIG. 1.

Then, the image 24 including the division regions of the upper portion, central portion and lower portion is generated as the division image 13. Then, the division image 13 is encoded as a P picture with reference to the division decoded image 42 at encoding time $t_{23}$ between encoding time $t_{12}$ and encoding time $t_{13}$ of the image 23 of the next frame to the image 22. By this, an encoded stream for the third AU of the image 24 is generated. At this time, the encoding mode for the region other than the lower division region is set to the skip mode. Accordingly, the decoding result of the encoded stream obtained upon encoding is the division decoded image 43 in which the region 31 of the upper portion and the region 32 of the central portion are same as those of the division decoded image 42, namely, an image corresponding to the overall region of the image 24 as depicted in C of FIG. 1.

Finally, at encoding time $t_{14}$, the image 24 is encoded as a P picture with reference to the division decoded image 43. By this, an encoded stream for the fourth AU of the image 24 is generated. At this time, the encoded stream is decoded, and a decoded image 44 having high picture quality in comparison with the division decoded image 43 is obtained as depicted in C of FIG. 1.

Further, pic_output_flag that is disposed in an encoded stream in which the division images 11 to 13 are AUs and indicates whether or not a decoded image thereof is to be displayed is set to 0 indicating that the decoded image is not to be displayed. Accordingly, the division decoded images 41 to 43 are not displayed. On the other hand, pic_output_flag disposed in an encoded stream in which the image 24 is an AU is set to 1 indicating that a decoded image thereof is to be displayed. Accordingly, the decoded image 44 is displayed.

As described above, in the encoding method according to the first embodiment, the image 24 of a frame expected to have a great bit generation amount is divided into a plurality of division images 11 to 13, which are individually encoded between encoding time $t_{10}$ to $t_{13}$ of the images 20 to 23 of frames before the image 24. Accordingly, local increase of the number of bits per unit time period that is an encoding time period of a unit of a frame can be suppressed. As a result, increase of local decoding load can be suppressed.

Further, at encoding time $t_{14}$ of the image 24, the image 24 is set as an AU, and encoding is performed with reference to the decoded image 43 of low picture quality corresponding to the overall region of the image 24. Therefore, an encoded stream of the decoded image 44 of high picture quality can be generated with a small bit generation amount.

Furthermore, since the region of the division image 11 other than the division region does not include image information, it indicates a fixed value image. Consequently, the bit generation amount of an encoded stream of the division image 11 can be reduced. Further, since the encoding mode of the region of the division image 12 and the division image 13 other than the division regions is set to the skip mode, the bit generation amount of encoded streams of the division image 12 and the division image 13 can be reduced.

It is to be noted that, although, in the example of FIG. 1, the image 24 of a frame expected to have a great bit generation amount is divided into four AUs and then encoded, it is a matter of course that the number of AUs into which the image is to be divided is not limited to four. Further, the number of division regions is a number obtained by subtracting 1 from the number of AUs into which the image is divided.

(Example of Configuration of First Embodiment of Encoding Apparatus)

Figure 2:
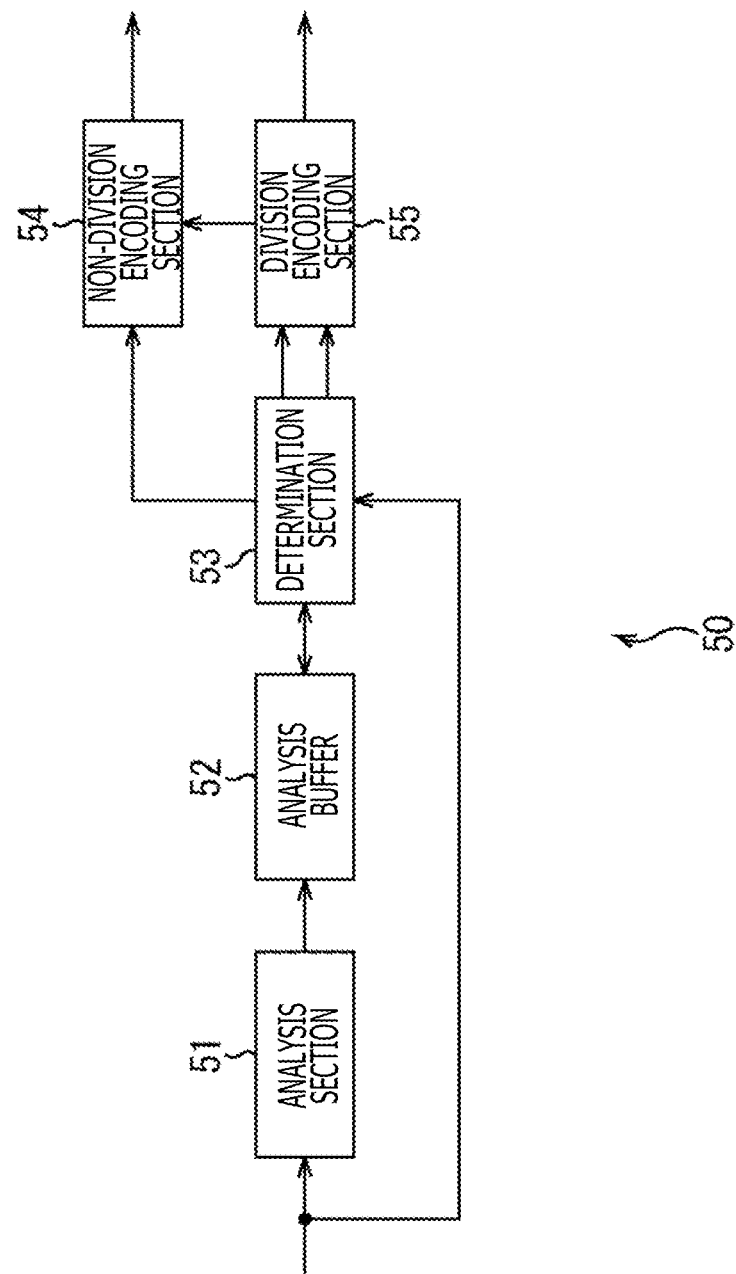
FIG. 2 is a block diagram depicting an example of a configuration of the first embodiment of the encoding apparatus to which the present disclosure is applied.

FIG. 2 is a block diagram depicting an example of a configuration of the first embodiment of an encoding apparatus to which the present disclosure is applied.

An encoding apparatus 50 of FIG. 2 includes an analysis section 51, an analysis buffer 52, a determination section 53, a non-division encoding section 54 and a division encoding section 55. The encoding apparatus 50 encodes an image of a unit of a frame inputted as an image of an encoding target by the encoding method described with reference to FIG. 1.

In particular, the analysis section 51 of the encoding apparatus 50 analyzes an image inputted thereto to generate an analysis table in a unit of an AU. The analysis section 51 supplies the analysis table of an AU unit to the analysis buffer 52 so as to be stored.

The determination section 53 reads out the analysis table from the analysis buffer 52 and determines an AU of an encoding target. In the case where the AU of the encoding target is an AU of an image, which is to be encoded with one AU, on the basis of the analysis table, the determination section 53 supplies an image corresponding to the AU to the non-division encoding section 54. On the other hand, in the case where the AU of the encoding target is an AU of an image, which is to be divided into a plurality of AUs and encoded, the determination section 53 supplies an image corresponding to the AUs and the analysis table to the division encoding section 55. Further, the determination section 53 updates the analysis table of the AU of the encoding target stored in the analysis section 51.

It is to be noted that, in the following description, to encode an image by one AU is referred to as non-division encoding, and to divide an image into a plurality of AUs and encode is referred to as division encoding.

The non-division encoding section 54 non-division encodes an image supplied from the determination section 53 by the HEVC method to generate encoded streams of AU units. At this time, the non-division encoding section 54 uses a decoded image supplied from the division encoding section 55 as a reference image as occasion demands. The non-division encoding section 54 outputs the generated encoded streams of AU units.

The division encoding section 55 division encodes an image by the HEVC method on the basis of an analysis table supplied from the determination section 53. In particular, in the case where the AU of the encoding target is an AU other than the last AU (hereinafter referred to as last division AU) from among AUs for division encoding, the division encoding section 55 generates division images from the image supplied from the determination section 53 on the basis of the analysis table. Then, the division encoding section 55 encodes the division images by the HEVC method and generates encoded streams of AU units in which 0 is disposed as pic_output_flag together with encoded data obtained as a result of the encoding.

On the other hand, in the case where the AU of the encoding target is the last division AU, the division encoding section 55 refers to a division decoded image corresponding to an AU immediately preceding to the last division AU to encode the image supplied from the determination section 53. The decoded image generated at this time is supplied to the non-division encoding section 54. The division encoding section 55 generates encoded streams of AU units in which 1 is disposed as pic_output_flag together with encoded data obtained as a result of the encoding. The division encoding section 55 outputs the generated encoded streams of AU units.

(Example of Configuration of Analysis Table)

Figure 3:
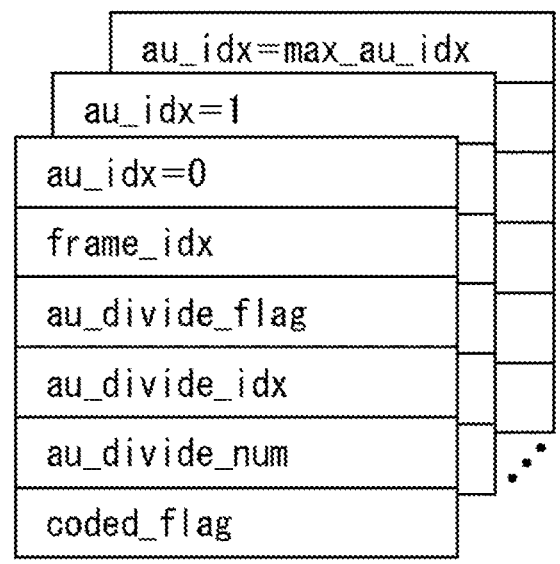
FIG. 3 is a view depicting an example of a configuration of an analysis table.

FIG. 3 is a view depicting an example of a configuration of an analysis table stored in the analysis buffer 52 of FIG. 2.

In the example of FIG. 3, in the analysis buffer 52, max_au_idx+1 AU analysis tables are stored. As depicted in FIG. 3, in the analysis tables, au_idx, frame_idx, au_divide_flag, au_divide_idx, au_divide_num and coded_flag are registered.

au_idx is an index for identifying the AU corresponding to this analysis table. frame_idx is an index for identifying a frame of an image corresponding to this analysis table. Further, au_divide_flag is a flag indicating whether the AU corresponding to this analysis table is a division encoded AU or a non-division encoded AU. au_divide_flag is 1 in the case where the AU corresponding to this analysis table is a division encoded AU but is 0 in the case where the AU corresponding to this analysis table is a non-division encoded AU.

au_divide_idx and au_divide_num are registered in the case where au_divide_flag is 1. au_divide_idx is an index for identifying what numbered AU among the division encoded AUs the AU corresponding to this analysis table is. au_divide_num is the total number of the division encoded AUs including the AU corresponding to this analysis table. coded_flag is a flag indicative of whether or not the AU corresponding to this analysis table is encoded already.

FIG. 4 is a view depicting an example of values registered in analysis tables in the case where the images 20 to 24 of FIG. 1 are inputted as images of an encoding target.

In the example of FIG. 4, indexes beginning with 0 are applied to AUs corresponding to frames in order beginning with the top frame. Further, indexes beginning with 0 are applied to the frames in order beginning with the top frame.

In the example of FIG. 1, the images of the frames other than the eighth frame from the top are non-division encoded. Accordingly, as depicted in FIG. 4, in the analysis table that corresponds to the image 20 of the fourth frame from the top and in which 3 is registered as au_idx and frame_idx, 0 is registered as au_divide_flag. Similarly, also in the analysis tables that correspond to the images 21 to 23 of the fifth to seventh frames from the top and in which 4 to 6 are registered as au_idx and frame_idx, respectively, 0 is registered as au_divide_flag.

Meanwhile, the image 24 of the eighth frame from the top is divided into four AUs and encoded. Accordingly, as depicted in FIG. 4, four analysis tables in which 7 to 10 are individually registered as au_idx are generated correspondingly to the image 24 of the eighth frame from the top. Since the images corresponding to the four analysis tables are the image 24 of the eighth frame from the top, 7 is registered as frame_idx in all of the four analysis tables. Further, since the image 24 is divided into the four AUs and encoded, 1 is registered as au_divide_flag and 4 is registered as au_divide_num in all of the four analysis tables. Furthermore, in the four analysis tables, 0 to 3 are individually registered in order as au_divide_idx.

Further, in the example of FIG. 4, encoding is not performed as yet for the images 20 to 24. Accordingly, 0 is registered in coded_flag of all the analysis tables.

(Example of Configuration of Non-Division Encoding Section)

Figure 5:
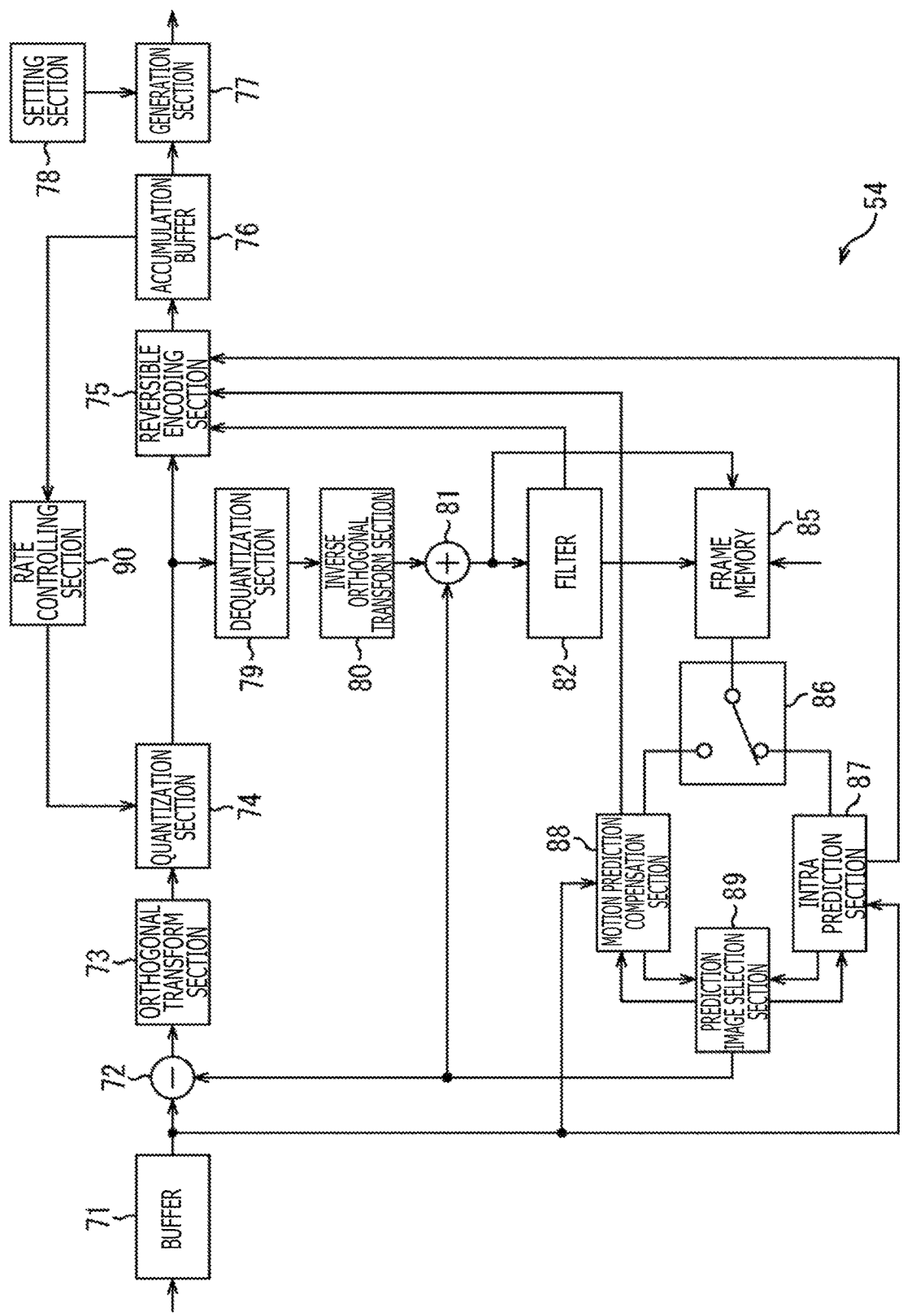
FIG. 5 is a block diagram depicting an example of a configuration of a non-division encoding section of FIG.

FIG. 5 is a block diagram depicting an example of a configuration of the non-division encoding section 54 of FIG. 2.

The non-division encoding section 54 of FIG. 5 includes a buffer 71, an arithmetic operation section 72, an orthogonal transform section 73, a quantization section 74, a reversible encoding section 75, an accumulation buffer 76, a generation section 77, a setting section 78, a dequantization section 79, an inverse orthogonal transform section 80 and an addition section 81. Further, the non-division encoding section 54 includes a filter 82, a frame memory 85, a switch 86, an intra prediction section 87, a motion prediction compensation section 88, a prediction image selection section 89 and a rate controlling section 90.

The buffer 71 of the non-division encoding section 54 stores an image supplied from the determination section 53 of FIG. 2. The buffer 71 outputs an image stored therein to the arithmetic operation section 72, intra prediction section 87 and motion prediction compensation section 88.

The arithmetic operation section 72 subtracts a prediction image supplied from the prediction image selection section 89 from an image supplied from the buffer 71 to perform encoding. The arithmetic operation section 72 outputs an image obtained as a result of the encoding as residual information to the orthogonal transform section 73.

The orthogonal transform section 73 orthogonally transforms the residual information from the arithmetic operation section 72 in a unit of a TU (transform unit). The orthogonal transform section 73 supplies an orthogonal transform coefficient obtained as a result of the orthogonal transform to the quantization section 74.

The quantization section 74 performs quantization for the orthogonal transform coefficient supplied from the orthogonal transform section 73. The quantization section 74 supplies the quantized orthogonal transform coefficient to the reversible encoding section 75.

The reversible encoding section 75 acquires intra prediction mode information indicative of an optimum intra prediction mode from the intra prediction section 87. Further, the reversible encoding section 75 acquires inter prediction mode information indicative of an optimum inter prediction mode, a motion vector, information for specifying a reference image and so forth from the motion prediction compensation section 88. Furthermore, the reversible encoding section 75 acquires offset filter information relating to an offset filter from the filter 82.

The reversible encoding section 75 performs reversible encoding such as arithmetic coding (for example, CABAC (Context-Adaptive Binary Arithmetic Coding) or the like) for the quantized orthogonal transform coefficient supplied from the quantization section 74.

Further, the reversible encoding section 75 reversibly encodes the intra prediction mode information or inter prediction mode information, motion vector, information for specifying a reference image and offset filter information as encoding information relating to encoding. The reversible encoding section 75 supplies the reversibly encoded encoding information and orthogonal transform coefficient as encoded data to the accumulation buffer 76 so as to be accumulated into the accumulation buffer 76.

The accumulation buffer 76 temporarily stores encoded data supplied from the reversible encoding section 75.

Further, the accumulation buffer 76 supplies the stored encoded data to the generation section 77.

The generation section 77 generates an encoded stream from a header part supplied from the setting section 78 and encoded data supplied from the accumulation buffer 76 and outputs the encoded stream.

The setting section 78 sets a slice header that includes 1 as pic_output_flag in a unit of a slice. Further, the setting section 78 sets parameter sets such as an SPS (Sequence Parameter Set), a PPS (Picture Parameter Set) and so forth as occasion demands. At this time, output_flag_present_flag which is disposed in the PPS and indicative of whether or not pic_output_flag exists in the slice header is set to 1. The setting section 78 encodes the set slice header and parameter set as a header part and supplies the encoded header part to the generation section 77.

Further, a quantized orthogonal transform coefficient outputted from the quantization section 74 is inputted also to the dequantization section 79. The dequantization section 79 performs dequantization for the orthogonal transform coefficient quantized by the quantization section 74 by a method corresponding to the quantization method by the quantization section 74. The dequantization section 79 supplies an orthogonal transform coefficient obtained as a result of the dequantization to the inverse orthogonal transform section 80.

The inverse orthogonal transform section 80 performs inverse orthogonal transform for the orthogonal transform coefficient supplied from the dequantization section 79 in a unit of a TU by a method corresponding to the orthogonal transform method by the orthogonal transform section 73. The inverse orthogonal transform section 80 supplies residual information obtained as a result of the inverse orthogonal transform to the addition section 81.

The addition section 81 adds the residual information supplied from the inverse orthogonal transform section 80 and a prediction image supplied from the prediction image selection section 89 to locally perform decoding. The addition section 81 supplies the locally decoded image to the filter 82 and the frame memory 85.

The filter 82 performs a deblock filter process for removing block distortion for an image supplied from the addition section 81. Then, the filter 82 performs an adaptive offset filter (SAO (Sample adaptive offset)) process for mainly removing ringing for the image after deblock filter process.

In particular, the filter 82 determines a type of an adaptive offset filter process for each LCU (Largest Coding Unit) that is a maximum encoding unit and determines an offset to be used in the adaptive offset filter process. The filter 82 uses the determined offset to perform an adaptive offset filter process of the determined type for the image after the deblock filter process.

The filter 82 supplies the image after the adaptive offset filter process to the frame memory 85. Further, the filter 82 supplies the type of the performed adaptive offset filter process and information indicative of the offset as offset filter information to the reversible encoding section 75.

The frame memory 85 accumulates an image supplied from the filter 82 and an image supplied from the addition section 81. Further, the frame memory 85 accumulates an image that is supplied as a decoded image from the division encoding section 55 depicted in FIG. 2 and for which the filter process has been performed. Pixels neighboring with a PU (Prediction Unit) in an image that is accumulated in the frame memory 85 and for which the filter process has not been performed are supplied as peripheral pixels to the intra prediction section 87 through the switch 86. On the other hand, an image that is accumulated in the frame memory 85 and for which the filter process has been performed is outputted as a reference image to the motion prediction compensation section 88 through the switch 86.

The intra prediction section 87 uses the peripheral pixels read out in a unit of a PU from the frame memory 85 through the switch 86 to perform an intra prediction process of all intra prediction modes that become candidates.

Further, the intra prediction section 87 calculates a cost function value (RD (Rate Distortion) cost) for all intra prediction modes that become candidates on the basis of an image read out from the buffer 71 and a prediction image generated as a result of the intra prediction process. Then, the intra prediction section 87 determines an intra prediction mode that indicates a minimum cost function value as an optimum intra prediction mode.

The intra prediction section 87 supplies a prediction image generated in the optimum intra prediction mode and a corresponding cost function value to the prediction image selection section 89. In the case where the intra prediction section 87 is notified of selection of the prediction image generated in the optimum intra prediction mode from the prediction image selection section 89, the intra prediction section 87 supplies the intra prediction mode information to the reversible encoding section 75.

The motion prediction compensation section 88 performs a motion prediction compensation process of all inter prediction modes that become candidates in a unit of a PU. In particular, the motion prediction compensation section 88 has a two-dimensional linear interpolation adaptive filter. Further, the motion prediction compensation section 88 uses the two-dimensional linear interpolation adaptive filter to perform an interpolation filter process for an image supplied from the buffer 71 and the reference image such that the image and the reference image have a high resolution.

The motion prediction compensation section 88 detects a motion vector in all inter prediction modes that become candidates in fractional pixel accuracy on the basis of the image and the reference image of the high resolution. Then, the motion prediction compensation section 88 performs a compensation process for the reference image on the basis of the motion vectors to generate a prediction image. It is to be noted that the inter prediction mode is a mode representative of a size and so forth of a PU, a skip mode and so forth.

Further, the motion prediction compensation section 88 calculates a cost function value for all inter prediction modes that become candidates on the basis of the image supplied from the buffer 71 and the prediction image and determines the inter prediction mode that indicates a minimum cost function value as an optimum inter prediction mode. Then, the motion prediction compensation section 88 supplies the cost function value of the optimum inter prediction mode and the corresponding prediction image to the prediction image selection section 89.

Further, in the case where the motion prediction compensation section 88 is notified of selection of the prediction image generated in the optimum inter prediction mode from the prediction image selection section 89, it outputs the inter prediction mode information, corresponding motion vector, information for specifying the reference image and so forth to the reversible encoding section 75.

The prediction image selection section 89 determines, on the basis of cost function values supplied from the intra prediction section 87 and the motion prediction compensation section 88, one of the optimum intra prediction mode and the optimum inter prediction mode, which is lower in corresponding cost function value, as an optimum prediction mode. Then, the prediction image selection section 89 supplies the prediction image of the optimum prediction mode to the arithmetic operation section 72 and the addition section 81. Further, the prediction image selection section 89 notifies the intra prediction section 87 or the motion prediction compensation section 88 of the selection of the prediction image of the optimum prediction mode.

The rate controlling section 90 controls the quantization parameter of the quantization section 74 on the basis of the encoded data accumulated in the accumulation buffer 76 such that overflow or underflow may not occur.

(Example of Configuration of Division Encoding Section)

Figure 6:
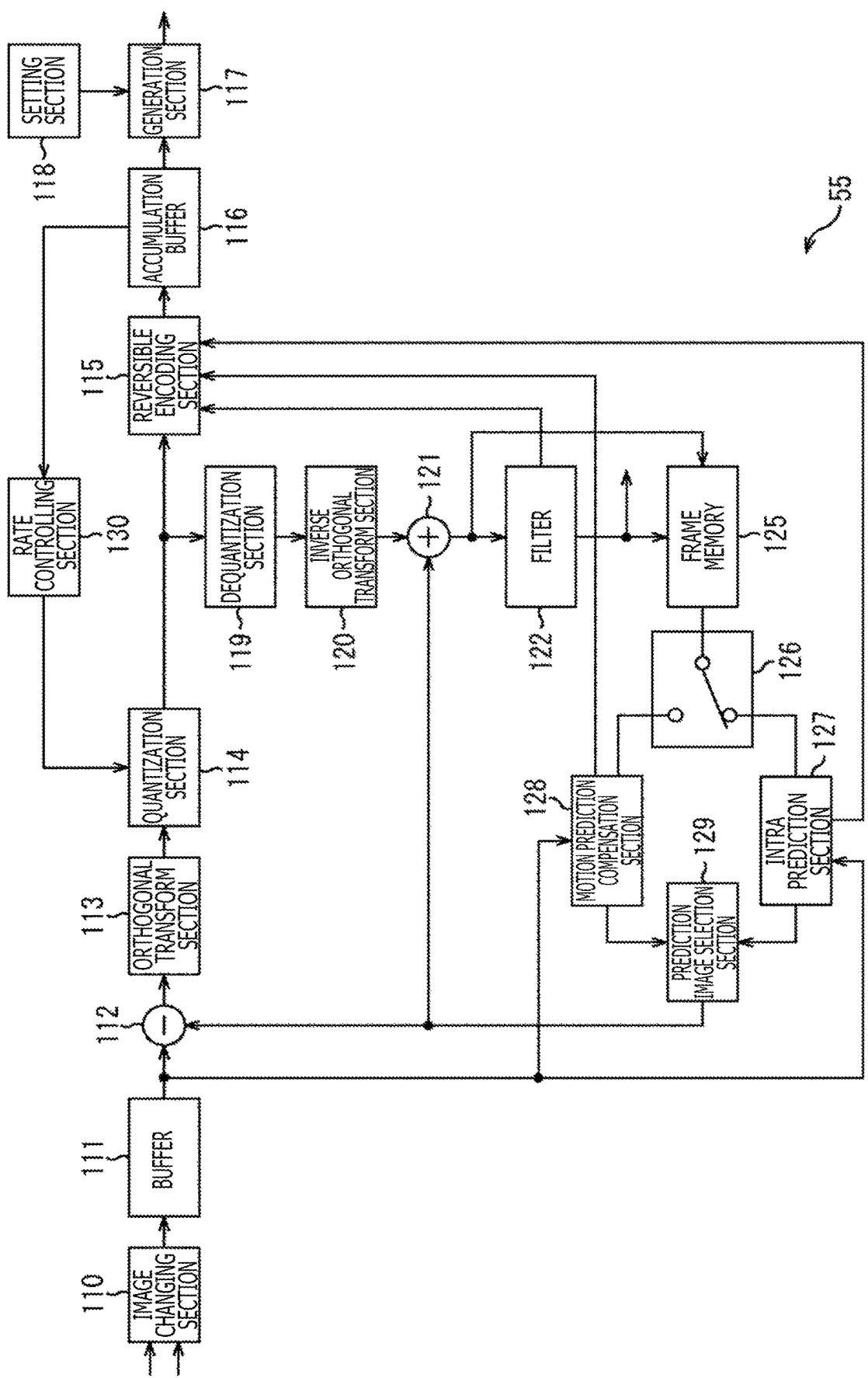
FIG. 6 is a block diagram depicting an example of a configuration of a division encoding section of FIG. 2.

FIG. 6 is a block diagram depicting an example of a configuration of the division encoding section 55 of FIG. 2.

The division encoding section 55 of FIG. 6 includes an image changing section 110, a buffer 111, an arithmetic operation section 112 (encoding section), an orthogonal transform section 113, a quantization section 114, a reversible encoding section 115, an accumulation buffer 116, a generation section 117, a setting section 118, a dequantization section 119, an inverse orthogonal transform section 120 and an addition section 121. Meanwhile, the non-division encoding section 54 includes a filter 122, a frame memory 125, a switch 126, an intra prediction section 127, a motion prediction compensation section 128, a prediction image selection section 129 and a rate controlling section 130.

The configuration of the components other than the image changing section 110, setting section 118, intra prediction section 127, motion prediction compensation section 128, prediction image selection section 129 and rate controlling section 130 of the division encoding section 55 is similar to the configuration of the components other than the setting section 78, intra prediction section 87, motion prediction compensation section 88, prediction image selection section 89 and rate controlling section 90 of the non-division encoding section 54 of FIG. 5. Accordingly, description of processing of the other components than the image changing section 110, setting section 118, intra prediction section 127, motion prediction compensation section 128 and prediction image selection section 129 is suitably omitted.

The image changing section 110 decides whether or not the AU of the encoding target is an AU other than the last division AU on the basis of au_divide_idx and au_divide_num of the analysis table supplied from the determination section 53 of FIG. 2.

In the case where the AU of the encoding target is an AU other than the last division AU, the image changing section 110 divides an image supplied from the determination section 53 into au_divide_num−1 division regions. Then, the image changing section 110 generates, on the basis of au_divide_idx, a division image for one frame that includes division regions from the top to the (au_divide_idx+1)th from among the au_divide_num−1 division regions and in which a region other than the division regions is a fixed value image, and supplies the generated division image to the buffer 111.

On the other hand, in the case where the AU of the encoding target is the last division AU, the image changing section 110 supplies an image supplied from the determination section 53 as it is to the buffer 111.

In the case where the AU of the encoding target is an AU other than the last division AU, the setting section 118 sets a slice header (non-display information) including 0 as pic_output_flag. On the other hand, in the case where the AU of the encoding target is the last division AU, the setting section 118 sets a slice header (display information) including 1 as pic_output_flag.

Further, the setting section 118 sets a parameter set such as an SPS or a PPS as occasion demands. At this time, output_flag_present_flag disposed in the PPS is set to 1. The setting section 118 encodes the set slice header or parameter set as a header part and supplies the header part to the generation section 117.

In the division encoding section 55, an image outputted from the filter 122 is supplied as a decoded image to the frame memory 85 of FIG. 5, and to the frame memory 125, an image is not supplied from the outside of the division encoding section 55.

In the case where the AU of the encoding target is the first AU in division encoding, the intra prediction section 127 performs an intra prediction process of all intra prediction modes that become candidates for a division image supplied from the buffer 111 similarly as in the intra prediction section 87 of FIG. 5.

Further, the intra prediction section 127 calculates a cost function value for all intra prediction modes that become candidates on the basis of a division image supplied from the buffer 111 and a prediction image generated as a result of the intra prediction process. Then, the intra prediction section 127 determines the intra prediction mode that indicates a minimum cost function value as an optimum intra prediction mode.

The intra prediction section 127 supplies the prediction image generated in the optimum intra prediction mode to the prediction image selection section 129. The intra prediction section 127 supplies the intra prediction mode information to the reversible encoding section 115.

In the case where the AU of the encoding target is an AU other than the first AU in division encoding, the motion prediction compensation section 128 performs, for a division region of a division image or an image supplied from the buffer 111, a motion prediction compensation process in all inter prediction modes that become candidates similarly as in the motion prediction compensation section 88 of FIG. 5. Further, the motion prediction compensation section 128 calculates, on the basis of the image supplied from the buffer 111 and the prediction image, a cost function value for all inter prediction modes that become candidates, and determines an inter prediction mode that indicates a minimum cost function value as an optimum inter prediction mode. Then, the motion prediction compensation section 128 supplies a prediction image generated in the optimum inter prediction mode to the prediction image selection section 129. Further, the motion prediction compensation section 128 outputs the inter prediction mode information, corresponding motion vector, information for specifying a reference image and so forth to the reversible encoding section 115.

Further, the motion prediction compensation section 128 performs inter encoding of the skip mode for a region of the division image other than division regions by supplying inter prediction information indicative of the skip mode and information for specifying a reference image to the reversible encoding section 115. In this case, an orthogonal transform coefficient is not inputted to the reversible encoding section 115, and reversible encoding is performed assuming that the orthogonal transform coefficient is 0.

The prediction image selection section 129 supplies a prediction image supplied from the intra prediction section 127 or the motion prediction compensation section 128 to the arithmetic operation section 112 and the addition section 121.

The rate controlling section 130 controls a quantization parameter of the quantization section 114 on the basis of the encoded data accumulated in the accumulation buffer 116 such that overflow or underflow may not occur.

The division encoding section 55 intra encodes division images corresponding to the first AU in division encoding in such a manner as described above. Further, the division encoding section 55 inter encodes division images and images corresponding to AUs other than the first AU in division encoding. At this time, the division encoding section 55 sets the encoding mode for a region in a division image other than the division regions to the skip mode.

(Description of Processing of Encoding Apparatus)

Figure 7:
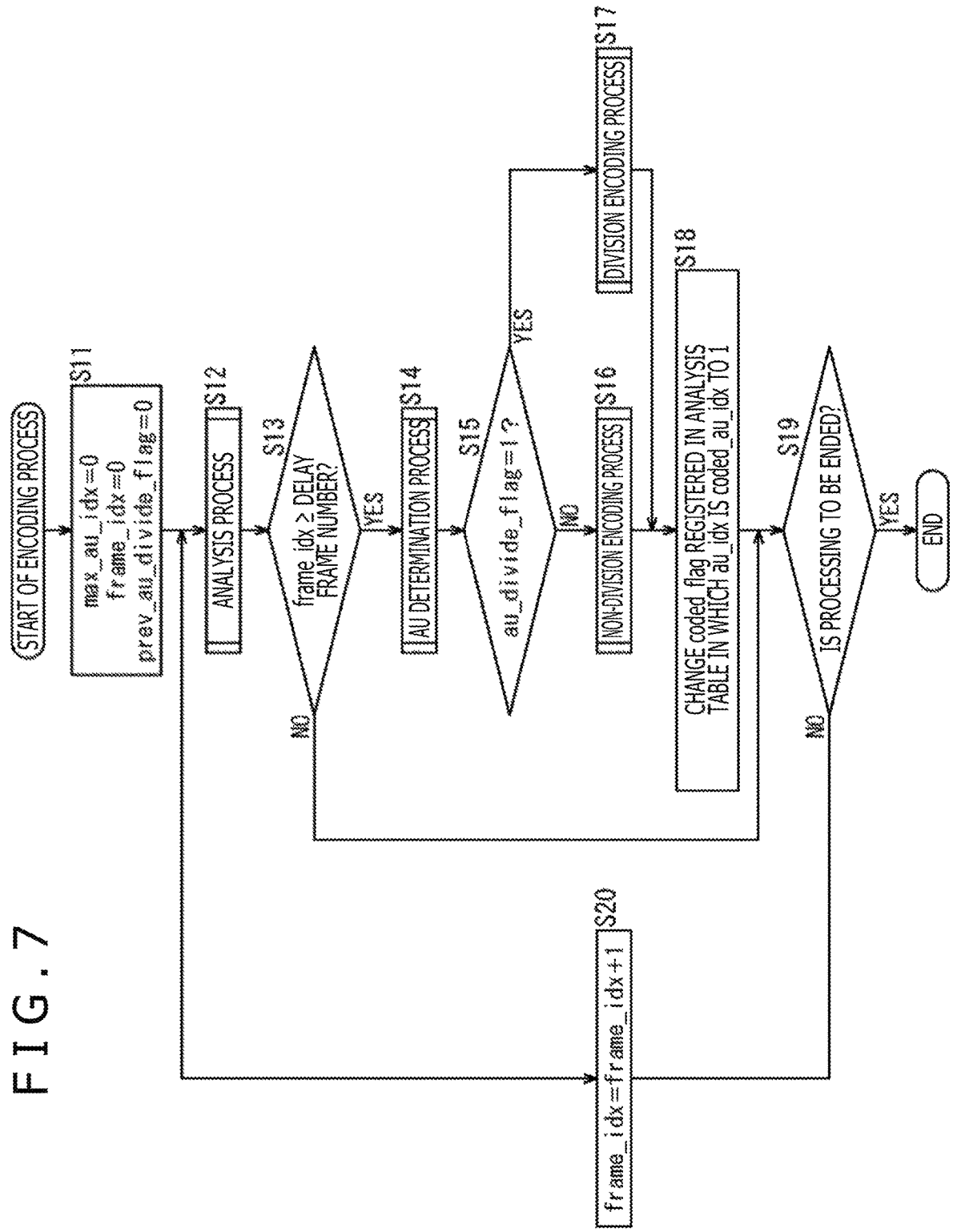
FIG. 7 is a flow chart illustrating an encoding process of the encoding apparatus of FIG. 2.

FIG. 7 is a flow chart illustrating an encoding process of the encoding apparatus 50 of FIG. 2.

At step S11 of FIG. 7, the analysis section 51 of the encoding apparatus 50 sets max_au_idx and frame_idx to 0, and the determination section 53 sets prev_au_divide_flag to 0. At step S12, the analysis section 51 performs an analysis process for generating an analysis table for an inputted image. Details of the analysis process are hereinafter described with reference to FIG. 8.

At step S13, the determination section 53 decides whether or not frame_idx is equal to or greater than a delay frame number. The delay frame number is the number of frames required to insert encoding of a division image upon division encoding and preceding to a frame of an image of an encoding target (in the example of FIG. 1, 3), namely, a number equal to or greater than a number obtained by subtracting 1 from max_divide_num that is the number of divisions of an AU in division encoding.

In the case where it is decided at step S13 that frame_idx is equal to or greater than the delay frame number, at step S14, the determination section 53 performs an AU determination process for determining an AU of an encoding target. Details of the AU determination process are hereinafter described with reference to FIG. 9.

At step S15, the determination section 53 decides whether or not au_divide_flag registered in the analysis table for the AU of the encoding target is 1. In the case where it is decided at step S15 that au_divide_flag is not 1, the determination section 53 supplies the image corresponding to the AU of the encoding target to the non-division encoding section 54.

Then, at step S16, the non-division encoding section 54 performs a non-division encoding process for non-division encoding an image supplied from the determination section 53. Details of the non-division encoding process are hereinafter described with reference to FIG. 10.

On the other hand, in the case where it is decided at step S15 that au_divide_flag is 1, the determination section 53 supplies the analysis table and the image for the AU of the encoding target to the division encoding section 55. Then at step S17, the division encoding section 55 performs a division encoding process for division encoding the image on the basis of the analysis table supplied from the determination section 53. Details of the division encoding process are hereinafter described with reference to FIG. 13.

After the process at step S16 or step S17, the processing advances to step S18. At step S18, the determination section 53 changes coded_flag, which is registered in the analysis table stored in the analysis buffer 52 in which au_idx is coded_au_idx set by the AU determination process at step S14, namely, in the analysis table for the AU of the encoding target, to 1. Then, the processing advances to step S19.

On the other hand, in the case where it is decided at step S13 that frame_idx is not equal to or greater than the delay frame number, namely, in the case where images of the number of frames necessary for insertion of encoding of division images are not inputted as yet, the processing advances to step S19.

At step S19, the encoding apparatus 50 decides whether or not the processing is to be ended, for example, whether or not a new image is not to be inputted to the encoding apparatus 50. In the case where it is decided at step S19 that the processing is not to be ended, the processing advances to step S20.

At step S20, the analysis section 51 increments frame_idx by 1. Then, the processing returns to step S12, and the processes at steps S12 to S19 are repeated until it is decided that the processing is to be ended.

On the other hand, in the case where it is decided at step S19 that the processing is to be ended, the processing is ended.

Figure 8:
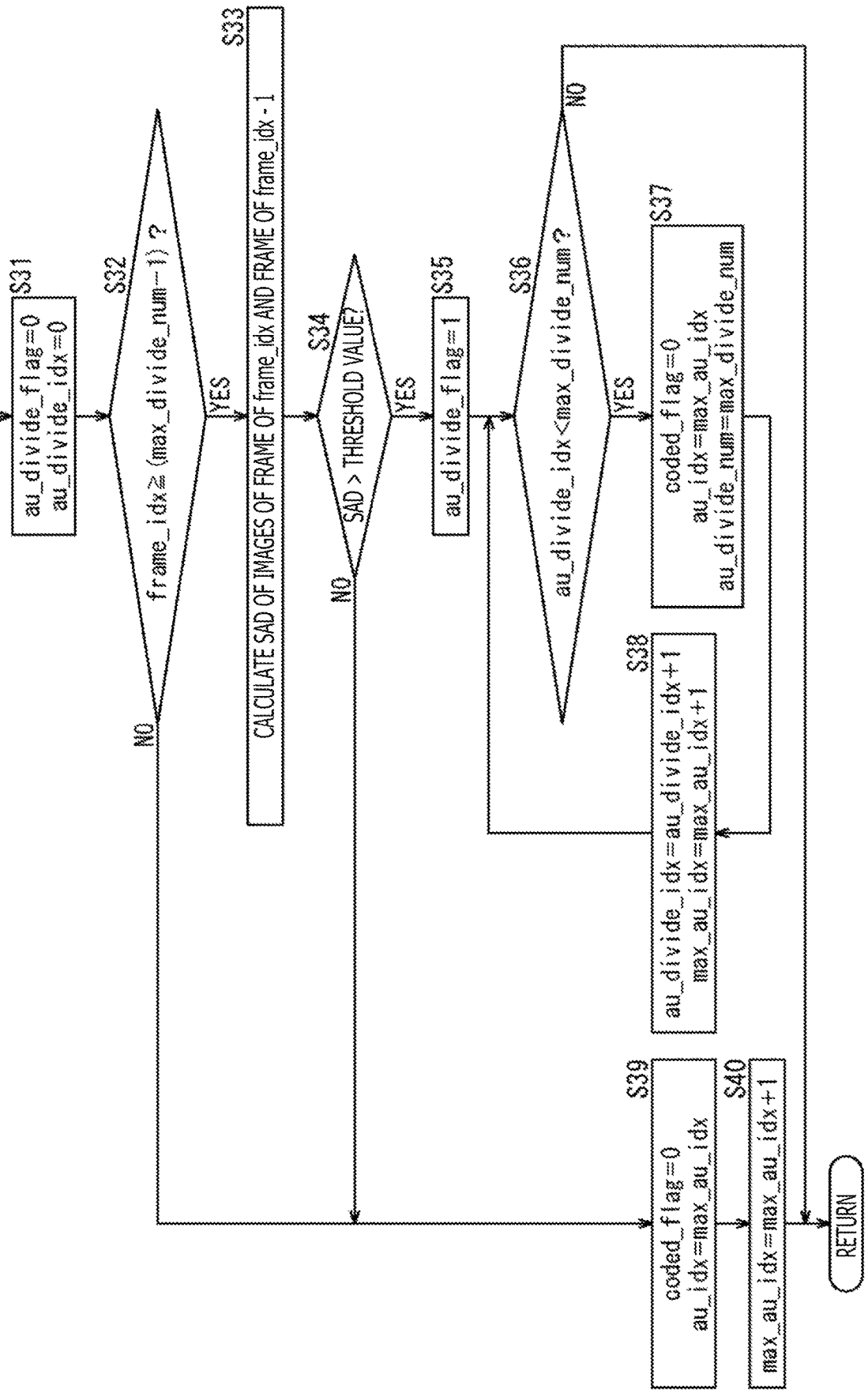
FIG. 8 is a flow chart illustrating an analysis process of FIG. 7.

FIG. 8 is a flow chart illustrating the analysis process at step S12 of FIG. 7.

At step S31 of FIG. 8, the analysis section 51 sets au_divide_flag and au_divide_idx to 0. At step S32, the analysis section 51 decides whether or not frame_idx is equal to or greater than a value obtained by subtracting 1 from max_divide_num.

In the case where it is decided at step S32 that frame_idx is equal to or greater than the value obtained by subtracting 1 from max_divide_num, namely, in the case where it is possible to division encode an image of a frame identified by the inputted frame_idx, the processing advances to step S33.

At step S33, the analysis section 51 calculates a SAD (Sum of Absolute Difference) in pixel value between pixels at same positions of an image of a frame identified by the inputted frame_idx and another image (preceding image) of a frame identified by frame_idx−1 preceding by one frame from the frame.

At step S34, the analysis section 51 decides whether or not the SAD calculated at step S33 is greater than a threshold value. In the case where it is decided at step S34 that the SAD is greater than the threshold value, the analysis section 51 decides that the frame identified by frame_idx is a scene change frame with which it is predicted that the bit generation amount of an encoded stream to be generated by non-division encoding increases, and advances the processing to step S35.

At step S35, the analysis section 51 decides that the image of the frame identified by frame_idx is to be division encoded, and changes au_divide_flag to 1.

At step S36, the analysis section 51 decides whether or not au_divide_idx is smaller than max_divide_num. In the case where it is decided at step S36 that au_divide_idx is smaller than max_divide_num, the analysis buffer 52 advances the processing to step S37.

At step S37, the analysis section 51 generates an analysis table in which 0 is registered as coded_flag, max_au_idx is registered as au_idx and max_divide_num is registered as au_divide_num. Further, the analysis section 51 registers frame_idx, au_divide_flag and au_divide_idx set at present into the analysis table. Then, the analysis section 51 supplies the generated analysis table to the analysis buffer 52 so as to be stored.

At step S38, the analysis section 51 increments au_divide_idx and max_au_idx by 1 and returns the processing to step S36. Consequently, the processes at steps S36 to S38 are repeated until after au_divide_idx becomes equal to or greater than max_divide_num. As a result, max_divide_num analysis tables are generated for the image of the frame identified by frame_idx.

On the other hand, in the case where it is decided at step S36 that au_divide_idx is equal to or greater than max_divide_num, the processing returns to step S12 of FIG. 7 and then advances to step S13.

Further, in the case where it is decided at step S32 that frame_idx is not equal to or greater than the value obtained by subtracting 1 from max_divide_num, namely, in the case where it is impossible as yet to division encode the image of the frame identified by the inputted frame_idx, the processing advances to step S39.

Further, in the case where it is decided at step S34 that the SAD is equal to or smaller than the threshold value, the analysis section 51 decides that the image of the frame identified by frame_idx is to be encoded by one AU, and advances the processing to step S39.

At step S39, the analysis section 51 generates an analysis table in which 0 is registered as coded_flag and max_au_idx is registered as au_idx. Further, the analysis section 51 registers frame_idx and au_divide_flag set at present into the analysis table. Then, the analysis section 51 supplies the generated analysis table to the analysis buffer 52 so as to be stored.

At step S40, the analysis section 51 increments max_au_idx by one, returns the processing to step S12 of FIG. 7, and then advances to step S13.

FIG. 9 is a flow chart illustrating the AU determination process at step S14 of FIG. 7.

At step S61 of FIG. 9, the determination section 53 sets idx and coded_au_divide_flag to 0 and sets coded_au_idx indicative of au_idx of the AU of the encoding target to −1 representing that this is not determined as yet. At step S62, the determination section 53 decides whether or not idx is smaller than max_au_idx, namely, whether or not an analysis table in which idx is registered as au_idx is stored in the analysis buffer 52.

In the case where it is decided at step S62 that idx is smaller than max_au_idx, the processing advances to step S63. At step S63, the determination section 53 determines the AU identified by au_idx that is idx as an AU of a processing target and reads out and acquires the analysis table in which idx is registered as au_idx from the analysis buffer 52.

At step S64, the determination section 53 decides whether or not coded_flag registered in the acquired analysis table is 0, namely, whether or not encoding of the AU corresponding to the acquired analysis table is not performed as yet.

In the case where it is decided at step S64 that coded_flag is 0, the processing advances to step S65. At step S65, the determination section 53 decides whether or not prev_au_divide_flag is 0 and au_divide_flag registered in the acquired analysis table is 1 and besides au_divide_idx is smaller than au_divide_num−1.

In the case where it is decided at step S65 that prev_au_divide_flag is 0 and au_divide_flag is 1 and besides au_divide_idx is smaller than au_divide_num−1, namely, in the case where the AU of the immediately preceding encoding target is not a division encoded AU and besides the AU of the processing target is not an AU other than the last division AU in division encoding, the processing advances to step S66.

At step S66, the determination section 53 determines idx at present as au_idx of the AU of the encoding target and changes coded_au_idx to idx. Consequently, the division coded AU is not successively made the AU of the encoding target. Further, the determination section 53 changes coded_au_divide_flag to 1.

At step S67, the determination section 53 changes prev_au_divide_flag to coded_au_divide_flag. Then, the processing returns to step S14 of FIG. 7 and advances to step S15.

On the other hand, in the case where it is decided at step S65 that prev_au_divide_flag is not 0 or au_divide_flag is not 1 or else au_divide_idx is equal to or greater than au_divide_num−1, namely, in the case where the AU of the immediately preceding encoding target is a division encoded AU or the AU of the processing target is a non-division encoded AU or the last division AU, the processing advances to step S68.

At step S68, the determination section 53 decides whether or not coded_au_idx is −1. In the case where it is decided at step S68 that coded_au_idx is −1, namely, in the case where a non-division encoded AU or the last division AU that is not encoded is not found as yet, the processing advances to step S69.

At step S69, the determination section 53 decides whether or not au_divide_flag is 0 or whether or not au_divide_idx is au_divide_num−1.

In the case where it is decided at step S69 that au_divide_flag is 0 or au_divide_idx is au_divide_num−1, namely, in the case where the AU of the processing target is a non-division encoded AU or the last division AU, the determination section 53 finds the AU of the processing target as a non-division encoded AU or the last division AU that is not encoded as yet.

Then at step S70, the determination section 53 provisionally determines idx at present to au_idx of the AU of the encoding target and sets coded_au_idx to idx and then sets coded_au_divide_flag to 0. Then, the processing advances to step S71.

On the other hand, in the case where it is decided at step S64 that coded_flag is not 0, namely, in the case where the AU of the processing target is an AU encoded already, the processing advances to step S71.

On the other hand, in the case where it is decided at step S68 that coded_au_idx is not −1, namely, in the case where a non-division encoded AU or the last division AU that is not encoded as yet is found already, the processing advances to step S71.

Furthermore, in the case where it is decided at step S69 that au_divide_flag is not 0 and besides au_divide_idx is not au_divide_num−1, namely, in the case where the AU of the processing target is an AU other than the last division AU in division encoding that is not encoded as yet, the processing advances to step S71.

At step S71, the determination section 53 increments idx by one and then returns the processing to step S62. Then, the processes at steps S62 to S65 and S68 to S71 are repeated until after the AU of the immediately preceding encoding target is a non-division encoded AU and besides a division encoded AU that is not encoded as yet is found out or until the AU of the immediately preceding encoding target is a division encoded AU and the AUs corresponding to all analysis tables stored in the analysis buffer 52 are made an AU of a processing target.

On the other hand, in the case where it is decided at step S62 that idx is equal to or greater than max_au_idx, namely, in the case where the AUs corresponding to all analysis tables stored in the analysis buffer 52 are made an AU of a processing target, the processing advances to step S67, at which the process at step S67 described hereinabove is performed. In particular, in this case, the non-division encoded AU or the last division AR identified by coded_au_idx set at step S70 is finally determined as AU of an encoding target.

By performing such an AU determination process as described above, in the case where an analysis table for an AU other than the last division AU in division encoding that is not encoded as yet is stored in the analysis buffer 52, the determination section 53 determines the AU preferentially as an AU of an encoding target. However, the determination section 53 does not determine an AU other than the last division AU in division encoding successively as an AU of an encoding target.

Figure 10:
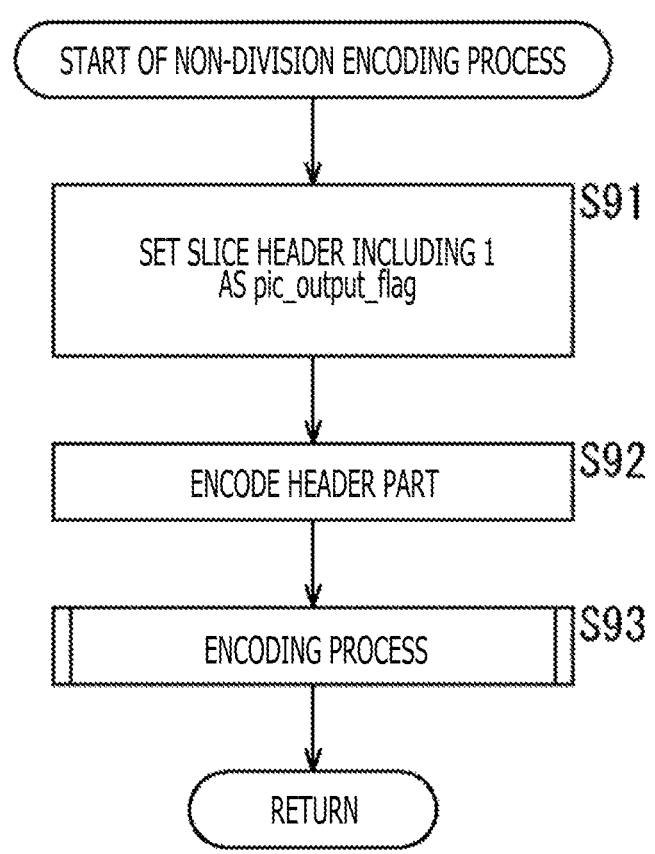
FIG. 10 is a flow chart illustrating a non-division encoding process of FIG. 7.

FIG. 10 is a flow chart illustrating the non-division encoding process at step S16 of FIG. 7.

At step S91 of FIG. 10, the setting section 78 of the non-division encoding section 54 (FIG. 5) sets a slice header of a slice unit including 1 as pic_output_flag. Further, the setting section 78 sets a parameter set as occasion demands.

At step S92, the setting section 78 encodes a header part of a set slice header, a parameter set and so forth and supplies the encoded header part to the generation section 77.

At step S93, the non-division encoding section 54 performs an encoding process for encoding an image corresponding to the AU of the encoding target. Details of the encoding process are hereinafter described with reference to FIGS. 11 and 12. After the process at step S93, the processing returns to step S16 of FIG. 7 and advances to step S18.

Figure 11:
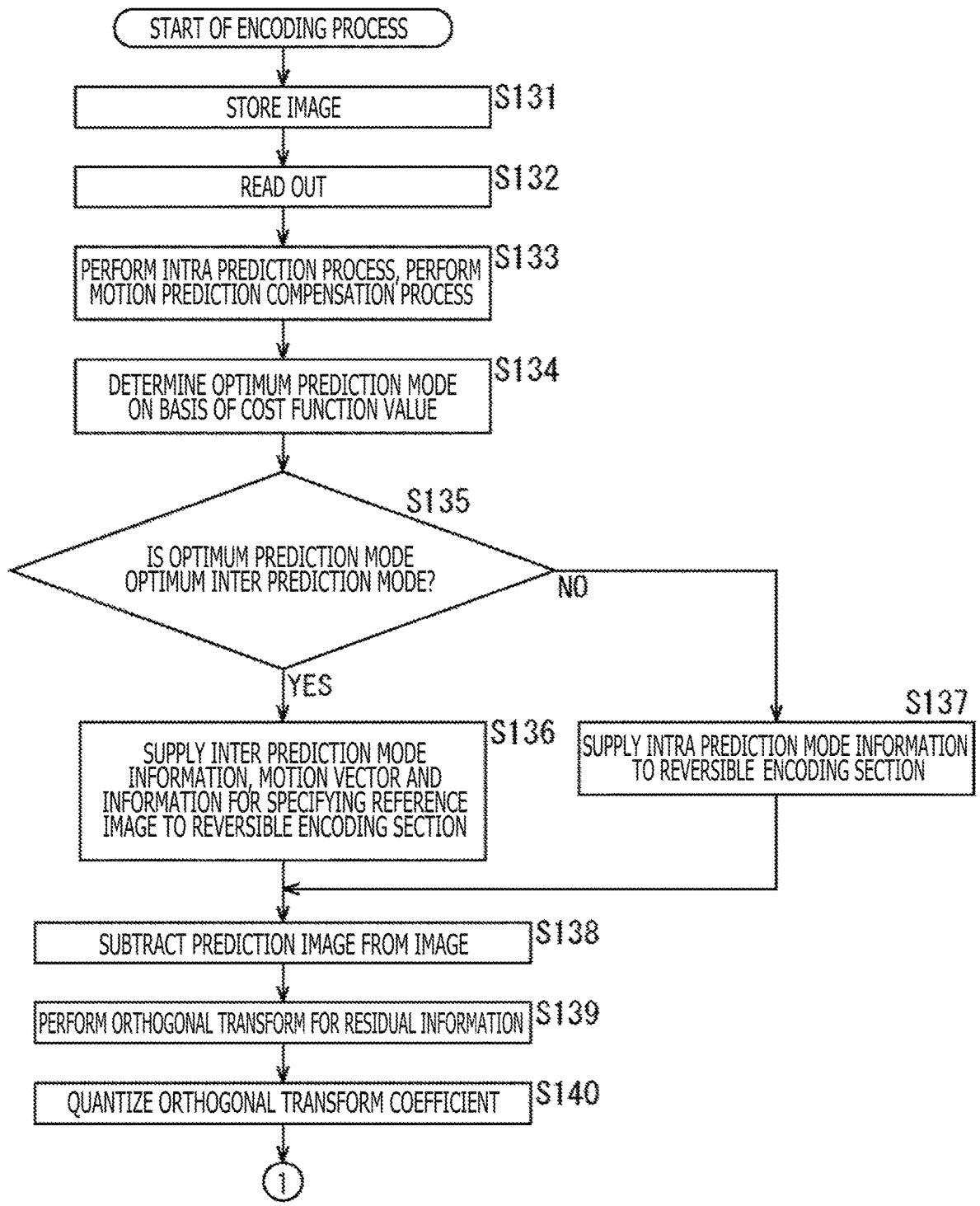
FIG. 11 is a flow chart illustrating an encoding process of FIG. 10.
Figure 12:
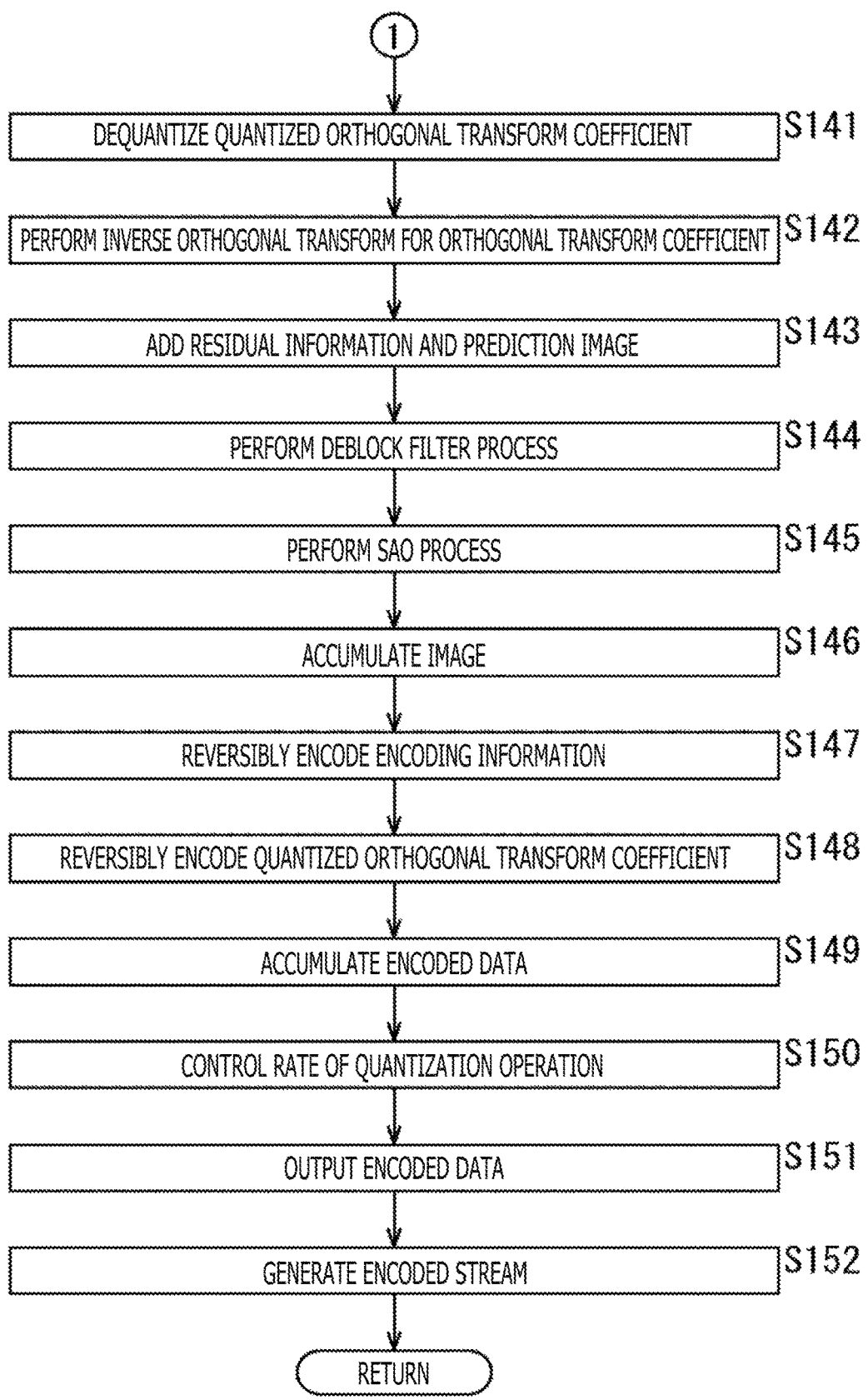
FIG. 12 is another flow chart illustrating the encoding process of FIG. 10.

FIGS. 11 and 12 are flow charts illustrating the encoding process at step S93 of FIG. 10.

At step S131 of FIG. 11, the buffer 71 of the non-division encoding section 54 (FIG. 5) stores an image supplied from the determination section 53 of FIG. 2. At step S132, the buffer 71 reads out images stored therein and supplies the images to the arithmetic operation section 72, intra prediction section 87 and motion prediction compensation section 88.

At step S133, the intra prediction section 87 performs an intra prediction process of all intra prediction modes that become candidates in a unit of a PU. Further, the intra prediction section 87 calculates a cost function value for all intra prediction modes that become candidates on the basis of the images read out from the buffer 71 and prediction images generated as a result of the intra prediction process. Then, the intra prediction section 87 determines an intra prediction mode that indicates a minimum cost function value as an optimum intra prediction mode. The intra prediction section 87 supplies the prediction image generated in the optimum intra prediction mode and the corresponding cost function value to the prediction image selection section 89.

Further, the motion prediction compensation section 88 performs a motion prediction compensation process in all inter prediction modes that become candidates in a unit of a PU. Further, the motion prediction compensation section 88 calculates a cost function value for all inter prediction modes that become candidates on the basis of the images supplied from the buffer 71 and the prediction images. Then, the motion prediction compensation section 88 determines an inter prediction mode that indicates a minimum cost function value as an optimum inter prediction mode. Then, the motion prediction compensation section 88 supplies the cost function value in the optimum inter prediction mode and the corresponding prediction image to the prediction image selection section 89.

At step S134, the prediction image selection section 89 determines, on the basis of the cost function values supplied from the intra prediction section 87 and the motion prediction compensation section 88, from between the optimum intra prediction mode and the optimum inter prediction mode, the mode that indicates a minimum cost function value as an optimum prediction mode. Then, the prediction image selection section 89 supplies the prediction image of the optimum prediction mode to the arithmetic operation section 72 and the addition section 81.

At step S135, the prediction image selection section 89 decides whether or not the optimum prediction mode is the optimum inter prediction mode. In the case where it is decided at step S135 that the optimum prediction mode is the optimum inter prediction mode, the prediction image selection section 89 notifies the motion prediction compensation section 88 of the selection of the prediction image generated in the optimum inter prediction mode.

Then, at step S136, the motion prediction compensation section 88 supplies the inter prediction mode information, motion vector and information that specifies a reference image to the reversible encoding section 75 and advances the processing to step S138.

On the other hand, in the case where it is decided at step S135 that the optimum prediction mode is not the optimum inter prediction mode, namely, in the case where the optimum prediction mode is the optimum intra prediction mode, the prediction image selection section 89 notifies the intra prediction section 87 of the selection of the prediction image generated in the optimum intra prediction mode. Then, at step S137, the intra prediction section 87 supplies the intra prediction mode information to the reversible encoding section 75 and advances the processing to step S138.

At step S138, the arithmetic operation section 72 performs encoding by subtracting the prediction image supplied form the prediction image selection section 89 from the image supplied from the buffer 71. The arithmetic operation section 72 outputs an image obtained as a result of the encoding as residual information to the orthogonal transform section 73.

At step S139, the orthogonal transform section 73 carries out orthogonal transform in a unit of a TU for the residual information from the arithmetic operation section 72 and supplies an orthogonal transform coefficient obtained as a result of the orthogonal transform to the quantization section 74.

At step S140, the quantization section 74 quantizes the orthogonal transform coefficient supplied from the orthogonal transform section 73 and supplies the quantized orthogonal transform coefficient to the reversible encoding section 75 and the dequantization section 79.

At step S141 of FIG. 12, the dequantization section 79 dequantizes the quantized orthogonal transform coefficient supplied from the quantization section 74 and supplies an orthogonal transform coefficient obtained as a result of the dequantization to the inverse orthogonal transform section 80.

At step S142, the inverse orthogonal transform section 80 carries out inverse orthogonal transform in a unit of a TU for the orthogonal transform coefficient supplied from the dequantization section 79 and supplies residual information obtained as a result of the inverse orthogonal transform to the addition section 81.

At step S143, the addition section 81 adds the residual information supplied from the inverse orthogonal transform section 80 and the prediction image supplied from the prediction image selection section 89 and locally performs decoding. The addition section 81 supplies the locally decoded image to the filter 82 and the frame memory 85.

At step S144, the filter 82 performs a deblock filter process for the locally decoded image supplied from the addition section 81.

At step S145, the filter 82 performs a SAO process for each LCU for the image after the deblock filter process. The filter 82 supplies an image obtained as a result of the SAO process to the frame memory 85. Further, the filter 82 supplies, for each LCU, offset filter information to the reversible encoding section 75.

At step S146, the frame memory 85 accumulates an image supplied from the filter 82 and an image supplied from the addition section 81. Further, the frame memory 85 accumulates an image, for which a filter process has been performed, supplied as a decoded image from the division encoding section 55. Pixels, which are positioned adjacent a PU, of an image that is accumulated in the frame memory 85 and for which the filter process has not been performed, are supplied as peripheral pixels to the intra prediction section 87 through the switch 86. On the other hand, images that are accumulated in the frame memory 85 and for which the filter process has been performed are outputted as reference images to the motion prediction compensation section 88 through the switch 86.

At step S147, the reversible encoding section 75 reversibly encodes the intra prediction mode information or inter prediction mode information, motion vector and information that specifies the reference images and the offset filter information as encoding information.

At step S148, the reversible encoding section 75 reversibly encodes the quantized orthogonal transform coefficient supplied from the quantization section 74. Then, the reversible encoding section 75 generates encoded data from the encoding information reversibly encoded by the process at step S147 and the reversibly encoded orthogonal transform coefficient, and supplies the encoded data to the accumulation buffer 76.

At step S149, the accumulation buffer 76 temporarily accumulates the encoded data supplied from the reversible encoding section 75.

At step S150, the rate controlling section 90 controls the rate of the quantization operation of the quantization section 74 on the basis of the encoded data accumulated in the accumulation buffer 76 such that overflow or underflow may not occur.

At step S151, the accumulation buffer 76 outputs the encoded data stored therein to the generation section 77.

At step S152, the generation section 77 generates an encoded stream from the header part supplied from the setting section 78 and the encoded data supplied from the accumulation buffer 76 and outputs the encoded stream. Then, the processing returns to step S93 of FIG. 10 and further returns to step S16 of FIG. 7 and then advances to step S18.

It is to be noted that, although, in the encoding process of FIGS. 11 and 12, an intra prediction process and a motion prediction compensation process are always performed in order to simplify description, only one of them is sometimes performed depending upon the picture type or the like.

Figure 13:
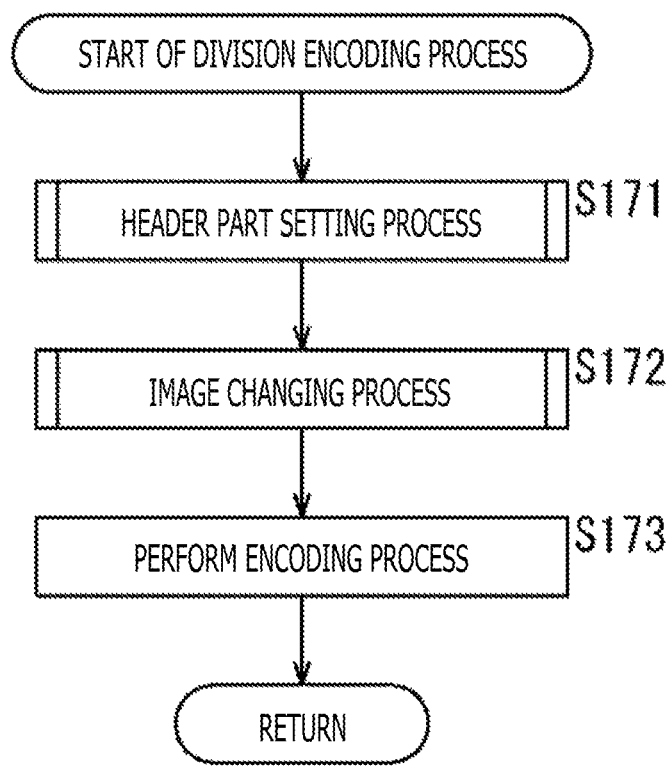
FIG. 13 is a flow chart illustrating a division encoding process of FIG. 7.

FIG. 13 is a flow chart illustrating the division encoding process at step S17 of FIG. 7.

At step S171 of FIG. 13, the setting section 118 of the division encoding section 55 (FIG. 6) performs a header part setting process for setting and encoding a header part. Details of the header part setting process are hereinafter described with reference to FIG. 14.

At step S172, the image changing section 110 performs an image changing process for changing an image on the basis of an analysis table supplied from the determination section 53. Details of the image changing process are hereinafter described with reference to FIG. 15.

At step S173, the division encoding section 55 performs an encoding process for encoding an image changed by the image changing section 110. Then, the process returns to step S17 of FIG. 7 and then advances to step S18.

Figure 14:
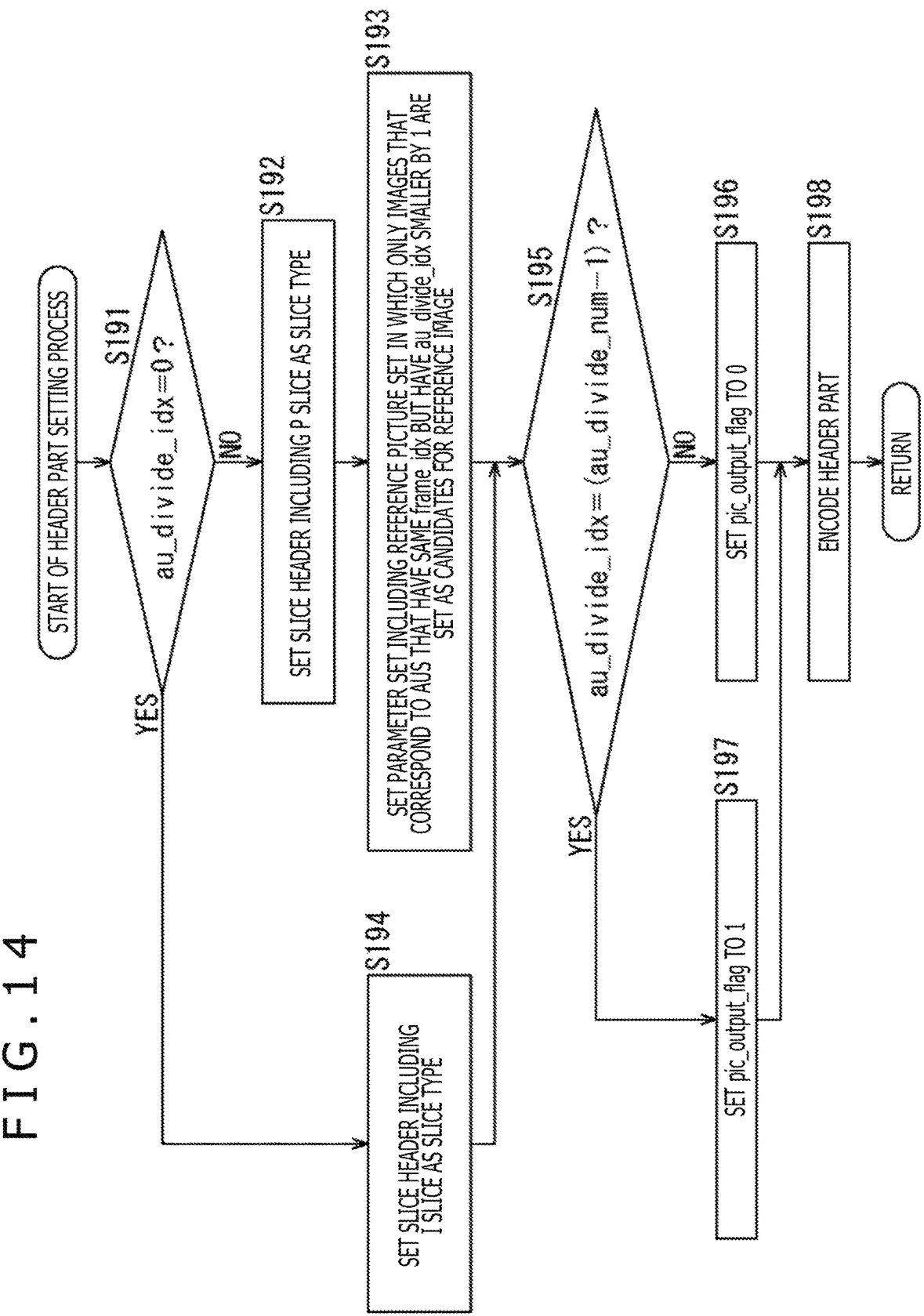
FIG. 14 is a flow chart illustrating a header part setting process of FIG. 13.

FIG. 14 is a flow chart illustrating the header part setting process at step S171 of FIG. 13.

At step S191 of FIG. 14, the setting section 118 decides whether or not au_divide_idx registered in the analysis table supplied from the determination section 53 is 0. In the case where it is decided at step S191 that au_divide_idx is not 0, namely, in the case where the AU of the encoding target is not the first AU in division encoding, the processing advances to step S192.

At step S192, the setting section 118 sets a slice header for the AU of the encoding target including a P slice as the slide type (slice_type). At step S193, the setting section 118 sets a parameter set including a reference picture set that is a list of candidates for a reference image in which only images that correspond to AUs that have same frame_idx as that of the AU of the encoding target but have au_divide_idx smaller by 1 from those of the AU of the encoding target are set as candidates for a reference image. Then, the processing advances to step S195.

On the other hand, in the case where it is decided at step S191 that au_divide_idx of the AU of the encoding target is 0, namely, in the case where the AU of the encoding target is the first AU in division encoding, the processing advances to step S194.

At step S194, the setting section 118 sets a slice header including an I slice as a slice type and advances the processing to step S195.

At step S195, it is decided whether or not au_divide_idx registered in the analysis table supplied from the determination section 53 is au_divide_num−1. In the case where it is decided at step S195 that au_divide_idx is not au_divide_num−1, namely, in the case where the AU of the encoding target is not the last division AU, the processing advances to step S196.

At step S196, the setting section 118 sets pic_output_flag included in the slice header set at step S193 or S194 to 0 and advances the processing to step S198.

On the other hand, in the case where it is decided at step S195 that au_divide_idx is au_divide_num−1, namely, in the case where the AU of the encoding target is the last division AU, the processing advances to step S197.

At step S197, the setting section 118 sets pic_output_flag included in the slice header set at step S193 or S194 to 1 and advances the processing to step S198.

At step S198, the setting section 118 encodes the set slice header and parameter set as a header part and supplies the encoded header part to the generation section 117. Then, the processing returns to step S171 of FIG. 13 and then advances to step S172.

Figure 15:
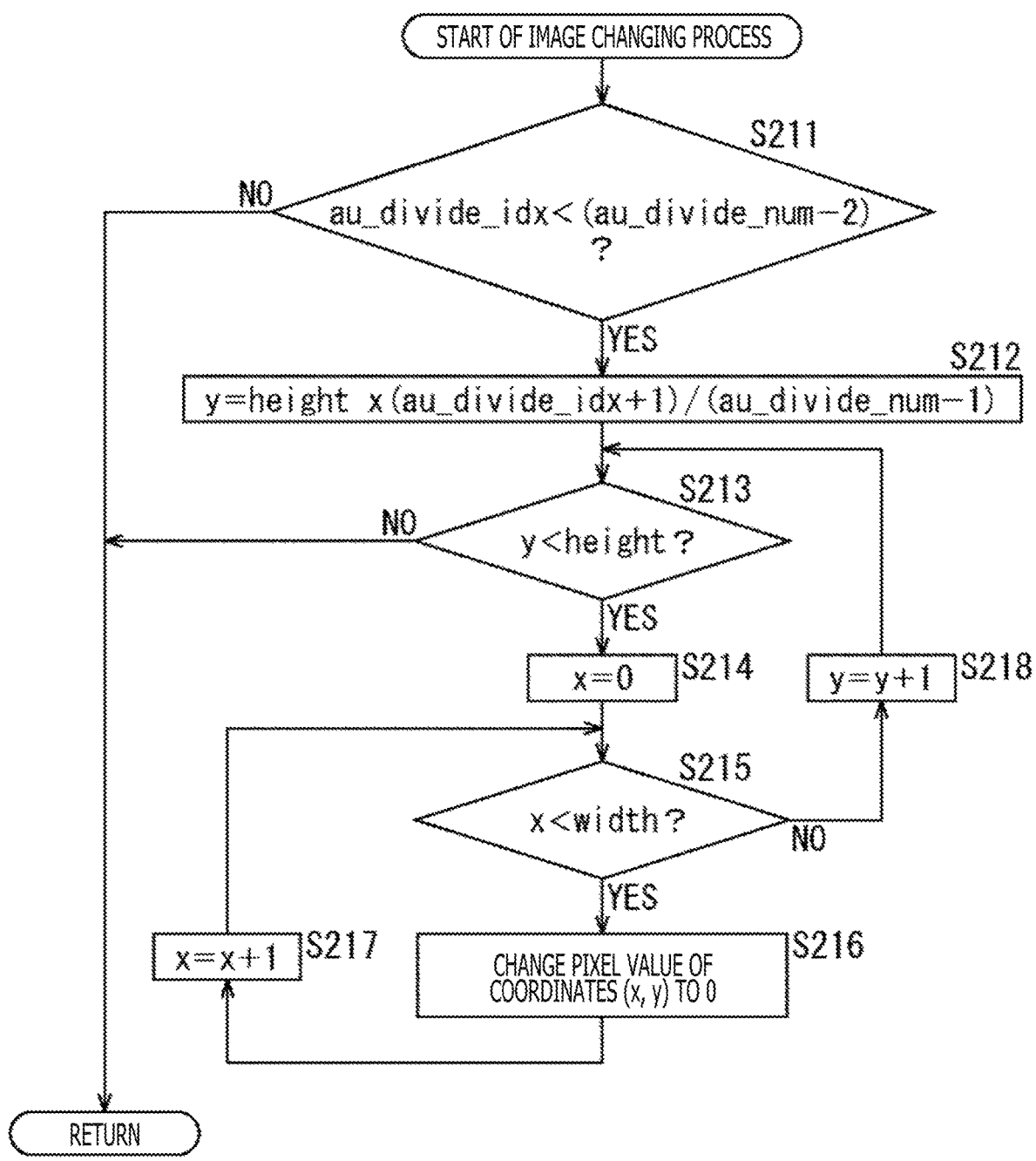
FIG. 15 is a flow chart illustrating an image changing process of FIG. 13.

FIG. 15 is a flow chart illustrating the image changing process at step S172 of FIG. 13.

At step S211 of FIG. 15, the image changing section 110 decides whether or not au_divide_idx registered in the analysis table supplied from the determination section 53 is smaller than au_divide_num−2. In the case where it is decided at step S211 that au_divide_idx is smaller than au_divide_num−2, namely, in the case where the AU of the encoding target is neither the last division AU nor the second AU from the last, the processing advances to step S212.

At step S212, the image changing section 110 multiplies the number of pixels, height, in the vertical direction of the image supplied from the determination section 53 by au_divide_idx+1 and sets a value obtained by dividing the multiplication value by au_divide_num−1 to a coordinate y. In particular, the image changing section 110 sets a y coordinate of a pixel at the top of the (au_divide_idx+2)th division region from the top from among division regions obtained by dividing pixels in the vertical direction of the image into au_divide_num−1 parts to the coordinate y. It is to be noted that the x coordinate of the pixel is an integral value representing what numbered pixel from the left the pixel is beginning with 0, and the y coordinate is an integral value representing what numbered pixel from the top the pixel is beginning with 0.

At step S213, the image changing section 110 decides whether or not the coordinate y is smaller than the pixel number height in the vertical direction of the image of the encoding target. In the case where it is decided at step S213 the coordinate y is smaller than the pixel number height in the vertical direction of the image, namely, in the case where the coordinate y represents the y coordinate of a pixel in the image, the processing advances to step S214.

At step S214, the image changing section 110 sets the coordinate x to 0. At step S215, the image changing section 110 decides whether or not the coordinate x is smaller than the number of pixels, width, in the horizontal direction of the image of the encoding target. In the case where it is decided at step S215 that the coordinate x is smaller than the pixel number width in the horizontal direction of the image, namely, in the case where the coordinate x represents the x coordinate of a pixel in the image, the processing advances to step S216.

At step S216, the image changing section 110 changes the pixel value of the coordinates (x, y) of the image supplied from the determination section 53 to 0. At step S217, the image changing section 110 increments x by 1 and returns the processing to step S215. Then, the processes at steps S215 to S217 are performed until the coordinate x becomes equal to or greater than the pixel number width in the horizontal direction of the image, namely, until the coordinate x represents the x coordinate of a pixel outside the image. Consequently, all pixels in a row of the coordinate y in the image supplied from the determination section 53 are changed into those of a black image.

On the other hand, in the case where it is decided at step S215 that the coordinate x is equal to or greater than the pixel number width in the horizontal direction of the image, the processing advances to step S218. At step S218, the image changing section 110 increments the coordinate y by 1 and returns the processing to step S213. Then, processes at steps S213 to S218 are repeated until the coordinate y becomes equal to or greater than the pixel number height in the vertical direction of the image, namely, until all pixels in the rows following the row of the coordinate y set at step S212 are changed to those of a black image.

In the case where it is decided at step S213 that the coordinate y is equal to or greater than the pixel number height in the vertical direction of the image, the image changing section 110 supplies the images after the change as division images to the buffer 111. Then, the processing returns to step S172 of FIG. 13 and advances to step S173.

On the other hand, in the case where it is decided at step S211 that au_divide_idx is equal to or greater than au_divide_num−2, namely, in the case where the AU of the encoding target is the last division AU or the second AU from the last in division encoding, the image changing section 110 supplies the image supplied from the determination section 53 as it is to the buffer 111. In particular, in the case where the AU of the encoding target is the second AU from the last in division encoding, the image changing section 110 supplies the image supplied from the determination section 53 as a division image to the buffer 111. On the other hand, in the case where the AU of the encoding target is the last division AU, the image changing section 110 supplies the image supplied from the determination section 53 as it is to the buffer 111. Then, the processing returns to step S172 of FIG. 13 and advances to step S173.

(Example of Configuration of Decoding Apparatus)

Figure 16:
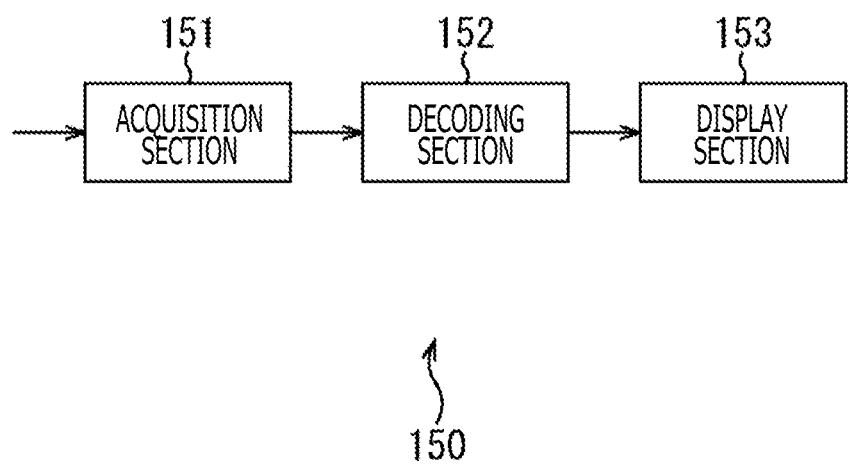
FIG. 16 is a view depicting an example of a configuration a decoding apparatus.

FIG. 16 is a view depicting an example of a configuration of the decoding apparatus that decodes an encoded stream outputted from the encoding apparatus 50 of FIG. 2.

The decoding apparatus 150 of FIG. 16 includes an acquisition section 151, a decoding section 152 and a display section 153.

The acquisition section 151 of FIG. 16 acquires an encoded stream outputted from the encoding apparatus 50 and supplies the encoded stream to the decoding section 152.

The decoding section 152 separates encoded data and a header part from the encoded stream supplied from the acquisition section 151. The decoding section 152 decodes the encoded data with reference to the header part as occasion demands. The decoding section 152 supplies, from among decoded images, only a decoded image corresponding to a slice header that includes 1 as pic_output_flag to the display section 153.

The display section 153 displays the decoded image supplied from the decoding section 152.

(Example of Configuration of Decoding Section)

Figure 17:
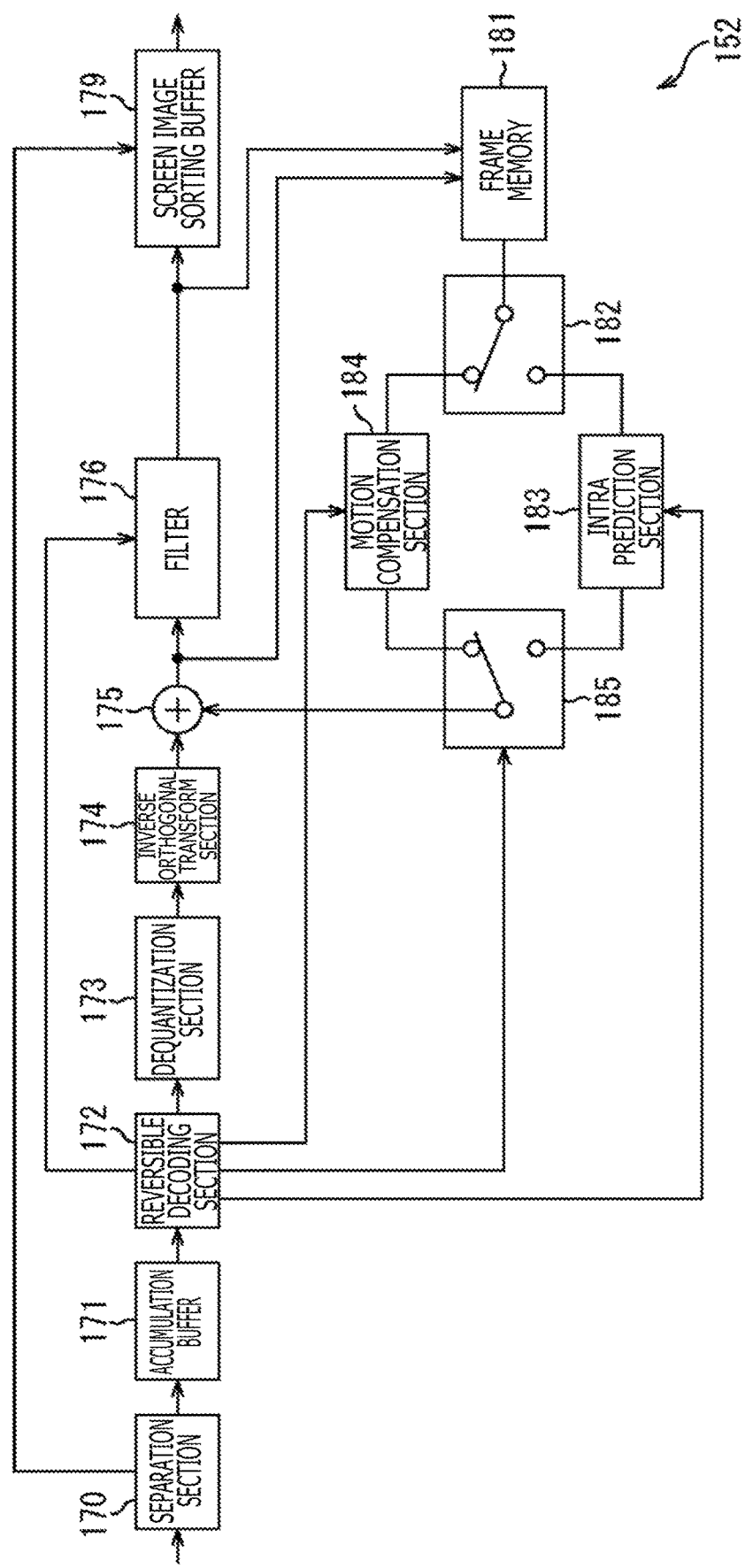
FIG. 17 is a block diagram depicting an example of a configuration of a decoding section of FIG. 16.

FIG. 17 is a block diagram depicting an example of a configuration of the decoding section 152 of FIG. 16.

The decoding section 152 of FIG. 17 includes a separation section 170, an accumulation buffer 171, a reversible decoding section 172, a dequantization section 173, an inverse orthogonal transform section 174, an addition section 175, a filter 176 and a screen image sorting buffer 179. Further, the decoding section 152 includes a frame memory 181, a switch 182, an intra prediction section 183, a motion compensation section 184 and a switch 185.

The separation section 170 of the decoding section 152 separates encoded data and a header part from an encoded stream supplied from the acquisition section 151 of FIG. 16. The separation section 170 supplies the encoded data to the accumulation buffer 171. Further, the separation section 170 supplies pic_output_flag included in the slice header of the header part to the screen image sorting buffer 179. Furthermore, the separation section 170 supplies information included in the header part to associated sections as occasion demands.

The accumulation buffer 171 accumulates the encoded data supplied from the separation section 170. The accumulation buffer 171 supplies accumulated encoded data to the reversible decoding section 172.

The reversible decoding section 172 performs reversible decoding such as arithmetic decoding or the like corresponding to the reversible encoding of the reversible encoding section 75 of FIG. 5 for the encoded data from the accumulation buffer 171 to obtain a quantized orthogonal transform coefficient and encoding information. The reversible decoding section 172 supplies the quantized orthogonal transform coefficient to the dequantization section 173. Further, the reversible decoding section 172 supplies intra prediction mode information and so forth as the encoding information to the intra prediction section 183. The reversible decoding section 172 supplies a motion vector, inter prediction mode information, information for specifying a reference image and so forth to the motion compensation section 184.

Furthermore, the reversible decoding section 172 supplies intra prediction mode information or inter prediction mode information as encoding information to the switch 185. The reversible decoding section 172 supplies offset filter information as encoding information to the filter 176.

The dequantization section 173, inverse orthogonal transform section 174, addition section 175, filter 176, frame memory 181, switch 182, intra prediction section 183 and motion compensation section 184 perform processes similar to those of the dequantization section 79, inverse orthogonal transform section 80, addition section 81, filter 82, frame memory 85, switch 86, intra prediction section 87 and motion prediction compensation section 88 of FIG. 5, respectively, thereby to decode an image.

In particular, the dequantization section 173 dequantizes a quantized orthogonal transform coefficient from the reversible decoding section 172 and supplies an orthogonal transform coefficient obtained as a result of the dequantization to the inverse orthogonal transform section 174.

The inverse orthogonal transform section 174 performs inverse orthogonal transform in a unit of a TU for the orthogonal transform coefficient from the dequantization section 173. The inverse orthogonal transform section 174 supplies residual information obtained as a result of the inverse orthogonal transform to the addition section 175.

The addition section 175 adds the residual information supplied from the inverse orthogonal transform section 174 and a prediction image supplied from the switch 185 to perform decoding. The addition section 175 supplies an image obtained as a result of the decoding to the filter 176 and the frame memory 181.

The filter 176 performs a deblock filter process for the image supplied from the addition section 175. The filter 176 uses, for each LCU, an offset represented by offset filter information from the reversible decoding section 172 to perform an adaptive offset filter process of a type represented by the offset filter information for the image after the deblock filter process. The filter 176 supplies an image after the adaptive offset filter process to the frame memory 181 and the screen image sorting buffer 179.

The screen image sorting buffer 179 stores, on the basis of pic_output_flag supplied from the separation section 170, only decoded images in regard to which pic_output_flag of all slices is 1 from among decoded images that are images supplied from the filter 176 in a unit of a frame. The screen image sorting buffer 179 sorts the stored decoded images of frame units such that the order of them for encoding into the original order for displaying and supplies the sorted decoded images to the display section 153 of FIG. 16.

The frame memory 181 accumulates an image supplied from the filter 176 and an image supplied from the addition section 175. Pixels positioned adjacent a PU from within images that are accumulated in the frame memory 181 and for which the filter process has not been performed are supplied as peripheral pixels to the intra prediction section 183 through the switch 182. Meanwhile, images that are accumulated in the frame memory 181 and for which the filter process has been performed are supplied as reference images to the motion compensation section 184 through the switch 182.

The intra prediction section 183 performs, in a unit of a PU, an intra prediction process of an optimum intra prediction mode indicated by intra prediction mode information supplied from the reversible decoding section 172 using the peripheral pixels read out from the frame memory 181 through the switch 182. The intra prediction section 183 supplies a prediction image generated as a result of the intra prediction process to the switch 185.

The motion compensation section 184 reads out a reference image specified by information for specifying a reference image supplied from the reversible decoding section 172 from the frame memory 181 through the switch 182. The motion compensation section 184 has a two-dimensional linear interpolation adaptive filter. The motion compensation section 184 performs an interpolation filter process for the reference image using the two-dimensional linear interpolation adaptive filter to convert the reference image into a high resolution image. The motion compensation section 184 uses the reference image converted into a high resolution image and a motion vector supplied from the reversible decoding section 172 to perform a motion compensation process of the optimum inter prediction mode indicated by inter prediction mode information supplied from the reversible decoding section 172 in a unit of a PU. The motion compensation section 184 supplies a prediction image generated as a result of the motion compensation process to the switch 185.

In the case where intra prediction mode information is supplied from the reversible decoding section 172, the switch 185 supplies a prediction image supplied from the intra prediction section 183 to the addition section 175. On the other hand, in the case where inter prediction mode information is supplied from the reversible decoding section 172, the switch 185 supplies a prediction image supplied from the motion compensation section 184 to the addition section 175.

(Process of Decoding Apparatus)

Figure 18:
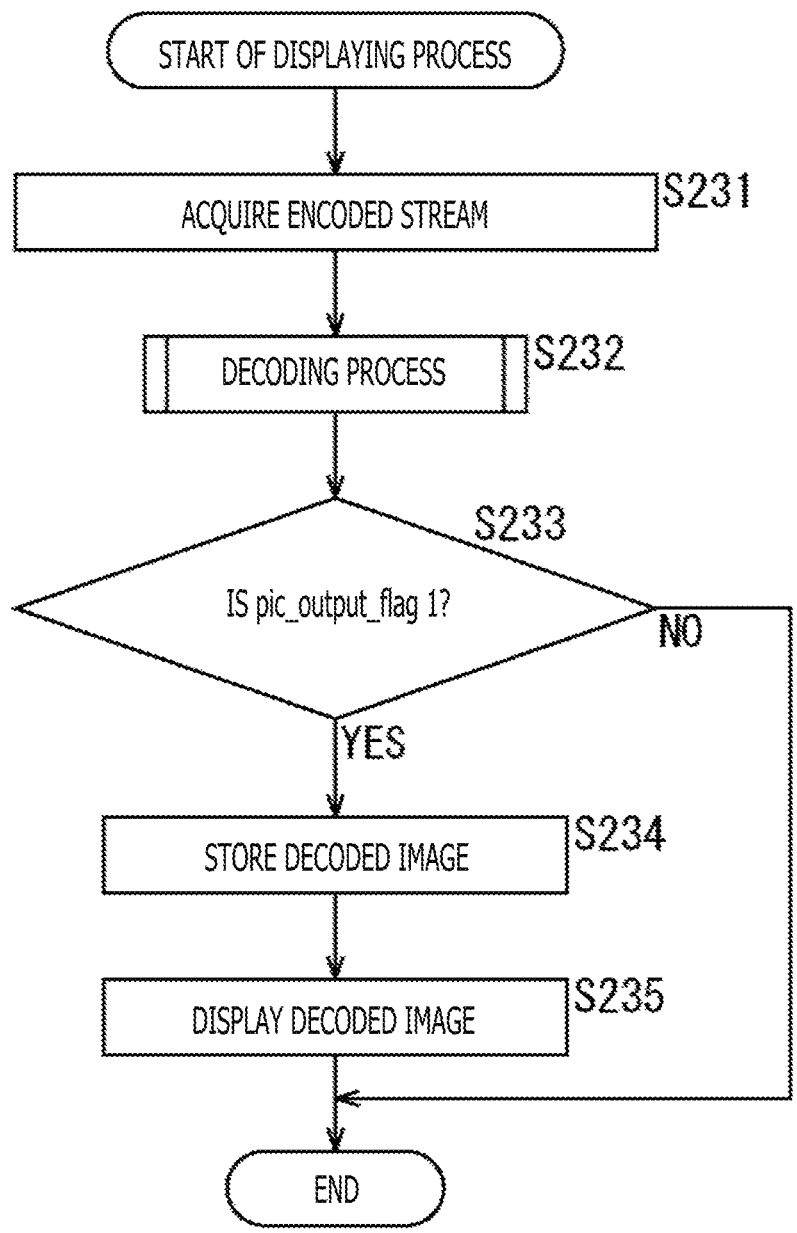
FIG. 18 is a flow chart illustrating a displaying process of the decoding apparatus of FIG. 16.

FIG. 18 is a flow chart illustrating a displaying process of the decoding apparatus 150 of FIG. 16.

At step S231 of FIG. 18, the acquisition section 151 acquires an encoded stream outputted from the encoding apparatus 50 and supplies the encoded stream to the decoding section 152.

At step S232, the decoding section 152 performs a decoding process for decoding encoded data included in the encoded stream supplied from the acquisition section 151. Details of the decoding process are hereinafter described with reference to FIG. 19.

At step S233, the screen image sorting buffer 179 decides whether or not pic_output_flag of all slices of a decoded image that is the image supplied from the filter 176 as a result of the decoding process at step S232 is 1. In the case where it is decided at step S233 that pic_output_flag of all slices of the decoded image is 1, namely, in the case where the decoded image is a decoded image of a non-division encoded AU or the last division AU, the processing advances to step S234.

At step S234, the screen image sorting buffer 179 stores decoded images and sorts the stored decoded images such that the order for decoding of the decoded images is changed into the original order for displaying, and supplies the decoded images of the original order to the display section 153 of FIG. 16.

At step S235, the display section 153 displays the decoded images supplied from the decoding section 152 and then ends the processing.

On the other hand, in the case where it is decided at step S233 that pic_output_flag of at least one slice of the decoded image is not 1, namely, in the case where the decoded image is a decoded image of an AU other than the last division AU in division encoding, the processing is ended.

Figure 19:
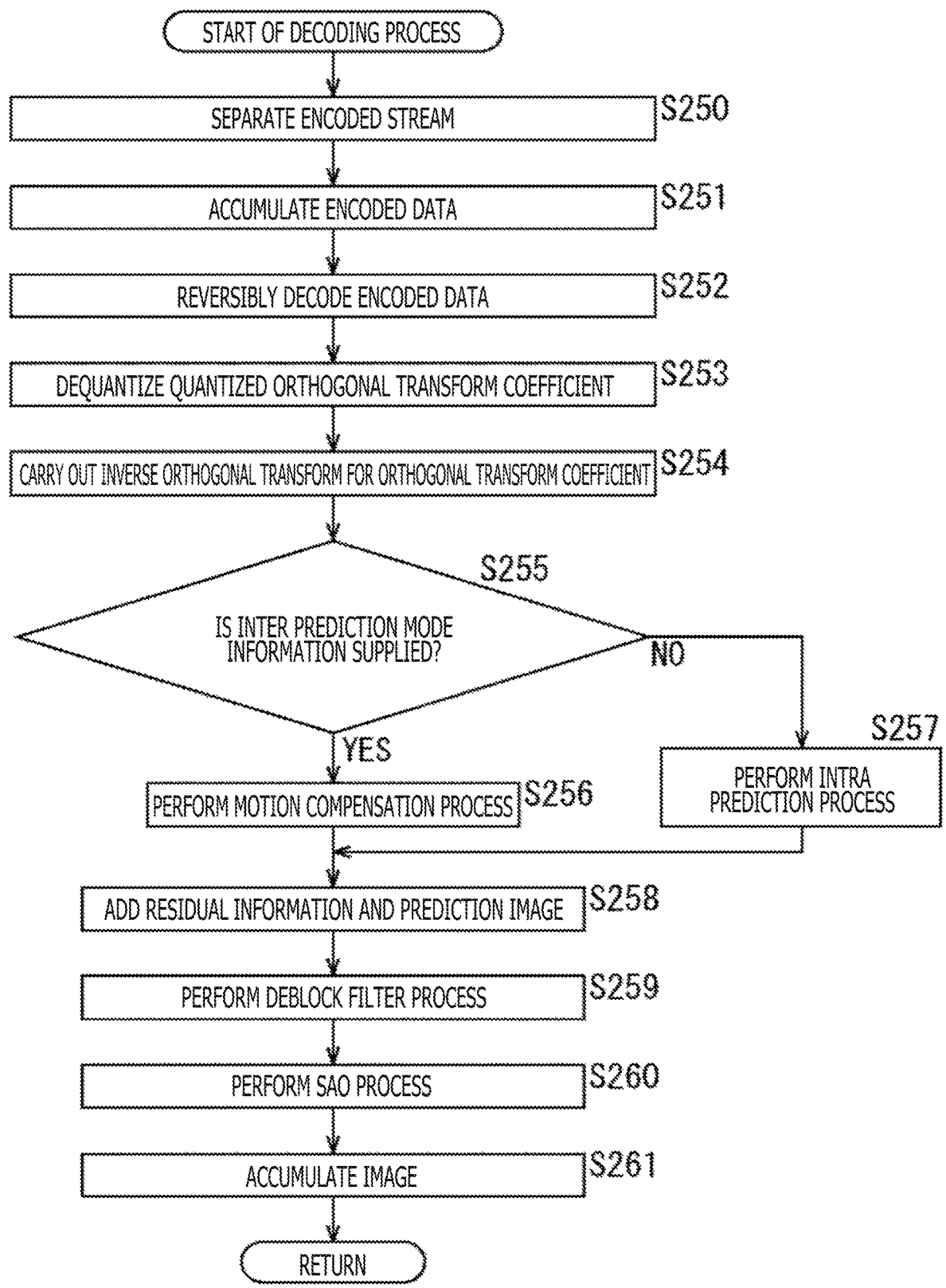
FIG. 19 is a flow chart illustrating details of the decoding process of FIG. 18.

FIG. 19 is a flow chart illustrating details of the decoding process at step S232 of FIG. 18.

At step S250 of FIG. 19, the separation section 170 of the decoding section 152 (FIG. 17) separates encoded data and a header part from an encoded stream supplied from the acquisition section 151. The separation section 170 supplies the encoded data to the accumulation buffer 171. Further, the separation section 170 supplies pic_output_flag included in the slice header of the header part to the screen image sorting buffer 179. Furthermore, the separation section 170 supplies information included in the header part to associated sections as occasion demands.

At step S251, the accumulation buffer 171 accumulates the encoded data supplied from the separation section 170. The accumulation buffer 171 supplies the accumulated encoded data to the reversible decoding section 172.

At step S252, the reversible decoding section 172 reversibly decodes the encoded data from the accumulation buffer 171 to obtain a quantized orthogonal transform coefficient and encoding information. The reversible decoding section 172 supplies the quantized orthogonal transform coefficient to the dequantization section 173.

Further, the reversible decoding section 172 supplies intra prediction mode information and so forth as the encoding information to the intra prediction section 183. The reversible decoding section 172 supplies a motion vector, inter prediction mode information, information for specifying the reference image and so forth to the motion compensation section 184.

Furthermore, the reversible decoding section 172 supplies intra prediction mode information or inter prediction mode information as the encoding information to the switch 185. The reversible decoding section 172 supplies offset filter information as the encoding information to the filter 176.

At step S253, the dequantization section 173 dequantizes the quantized orthogonal transform coefficient from the reversible decoding section 172 and supplies an orthogonal transform coefficient obtained as a result of the dequantization to the inverse orthogonal transform section 174.

At step S254, the inverse orthogonal transform section 174 carries out inverse orthogonal transform for the orthogonal transform coefficient from the dequantization section 173 and supplies residual information obtained as a result of the inverse orthogonal transform to the addition section 175.

At step S255, the motion compensation section 184 decides whether or not inter prediction mode information is supplied from the reversible decoding section 172. In the case where it is decided at step S255 that inter prediction mode information is supplied, the processing advances to step S256.

At step S256, the motion compensation section 184 reads out, in a unit of a PU, a reference image on the basis of information that specifies a reference image supplied from the reversible decoding section 172 and performs a motion compensation process of an optimum inter prediction mode indicated by the inter prediction mode information using the motion vector and the reference image. The motion compensation section 184 supplies a prediction image generated as a result of the motion compensation process to the addition section 175 through the switch 185 and advances the processing to step S258.

On the other hand, in the case where it is decided at step S255 that inter prediction mode information is not supplied, namely, in the case where intra prediction mode information is supplied to the intra prediction section 183, the processing advances to step S257.

At step S257, the intra prediction section 183 performs, in a unit of a PU, an intra prediction process of an intra prediction mode indicated by the intra prediction mode information using the peripheral pixels read out from the frame memory 181 through the switch 182. The intra prediction section 183 supplies a prediction image generated as a result of the intra prediction process to the addition section 175 through the switch 185 and advances the processing to step S258.

At step S258, the addition section 175 adds the residual information supplied from the inverse orthogonal transform section 174 and the prediction image supplied from the switch 185 to locally perform decoding. The addition section 175 supplies an image obtained as a result of the decoding to the filter 176 and the frame memory 181.

At step S259, the filter 176 performs a deblock filter process for the image supplied from the addition section 175 to remove block distortion from the image.

At step S260, the filter 176 performs a SAO process for each LCU for the image after the deblock filter process on the basis of offset filter information supplied from the reversible decoding section 172. The filter 176 supplies an image after the SAO process to the frame memory 181 and the screen image sorting buffer 179.

At step S261, the frame memory 181 accumulates the image supplied from the addition section 175 and the image supplied from the filter 176. Pixels that are positioned adjacent a PU from within images that are accumulated in the frame memory 181 and for which a filter process has not been performed are supplied as peripheral pixels to the intra prediction section 183 through the switch 182. On the other hand, images that are accumulated in the frame memory 181 and for which the filter process has been performed are supplied as reference images to the motion compensation section 184 through the switch 182. Then, the processing returns to step S232 of FIG. 18 and then advances to step S233.

As described above, the encoding apparatus 50 divides an image into a plurality of AUs and encodes them. Accordingly, the bit generation amount of an encoded stream per unit time period can be leveled.

Further, the encoding apparatus 50 can generate an encoded stream of high picture quality in comparison with that in an alternative case in which the bit generation amount is suppressed by increasing a quantization parameter. In contrast, in the case where the bit generation amount is suppressed by increasing a quantization parameter, the picture quality not only of a decoded image of an encoded stream for which the bit generation amount is suppressed but also of a decoded image that refers to the decoded image is degraded.

The decoding apparatus 150 can decode an image of high picture quality without locally generating high load by decoding an encoded stream of high picture quality generated by the encoding apparatus 50 and leveled in bit generation amount. In other words, an image of low load and high picture quality can be decoded.

Further, the encoding apparatus 50 sets pic_output_flag of a decoded image of an AU other than the last division AU in division encoding to 0. Accordingly, the decoding apparatus 150 can avoid displaying of a decoded image of an AU other than the last division AU in division encoding, namely, an image during a decoding process of a division encoded stream, on the basis of this pic_output_flag.

Second Embodiment (Overview of Encoding Method)

Figure 20:
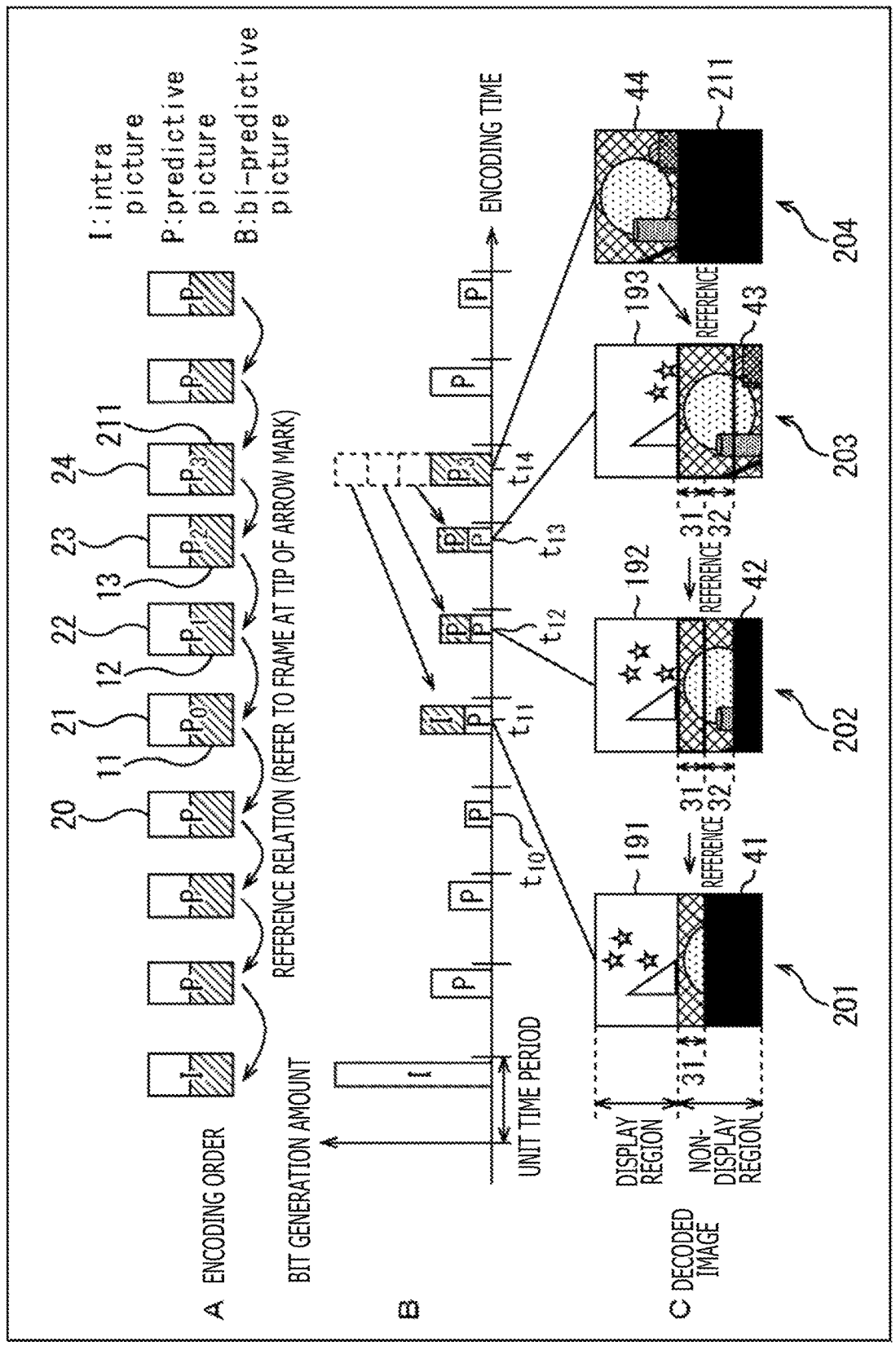
FIG. 20 is a view illustrating an overview of an encoding method according to a second embodiment of an encoding apparatus to which the present disclosure is applied.

FIG. 20 is a view illustrating an overview of an encoding method in the second embodiment of an encoding apparatus to which the present disclosure is applied.

From among components depicted in FIG. 20, components same as those in FIG. 1 are denoted by the same reference signs. Overlapping description is suitably omitted.

The encoding method in the second embodiment is different from the encoding method in the first embodiment in that a division image or a black image and an image to be non-division encoded or an image corresponding to the last division AU are synthesized and encoded simultaneously and that the region of the division image or the black image in a decoded image is not displayed.

In particular, as depicted in A of FIG. 20 and B of FIG. 20, a division image 11 is synthesized to a lower portion of an image 21 three frames before an image 24 and is encoded as a P picture at encoding time $t_{11}$ of the image 21. At this time, the image 21 is encoded by reference to an image of a frame preceding to the image 21 as occasion demands, and the division image 11 is intra encoded similarly as in the first embodiment. As a result, a decoding result of an encoded stream obtained upon encoding becomes a synthesis image 201 in which a division decoded image 41 is synthesized to a lower portion of a decoded image 191 of the image 21 as depicted in C of FIG. 20.

Then, a division image 12 is synthesized to a lower portion of an image 22 of a next frame to the image 21 and is encoded as a P picture at encoding time $t_{12}$ of the image 22. At this time, the image 22 is encoded with reference to the decoded image 191 in the synthesis image 201 or a decoded image of a frame preceding to the decoded image 191 as occasion demands, and the division image 12 is encoded similarly as in the first embodiment with reference to the division decoded image 41. As a result, a decoding result of an encoded stream obtained upon encoding becomes a synthesis image 202 in which a division decoded image 42 is synthesized to a lower portion of a decoded image 192 of the image 22 as depicted in C of FIG. 20.

Thereafter, a division image 13 is synthesized to a lower portion of an image 23 of a next frame to the image 22 and is encoded as a P picture at encoding time $t_{13}$ of the image 23. At this time, the image 23 is encoded with reference to the decoded image 192 in the synthesis image 202 or a decoded image of a frame preceding to the decoded image 192 as occasion demands, and the division image 13 is encoded similarly as in the first embodiment with reference to the division decoded image 42. As a result, a decoding result of an encoded stream obtained upon encoding becomes a synthesis image 203 in which a division decoded image 43 is synthesized to a lower portion of a decoded image 193 of the image 23 as depicted in C of FIG. 20.

Finally, a black image 211 is synthesized to a lower portion of the image 24 and is encoded as a P picture at encoding time $t_{14}$ of the image 24. At this time, the image 24 is encoded similarly as in the first embodiment with reference to the division decoded image 43 in the synthesis image 203, and the black image 211 is encoded with reference to the decoded image 193 or a decoded image of a frame preceding to the decoded image 193 as occasion demands. As a result, a decoding result of an encoded stream obtained upon encoding becomes a synthesis image 204 in which the black image 211 is synthesized to a lower portion of a decoded image 44 as depicted in C of FIG. 20.

Further, to encoded streams of the synthesis images 201 to 203, information for designating the regions of the upper half decoded images 191 to 193 of the synthesis images 201 to 203 as a display region is set, respectively. Further, in an encoded stream of the image 204, information for designating the region of the upper half decoded image 44 of the synthesis image 204 as a display region is designated. Accordingly, the division decoded images 41 to 43 and the black image 211 are not displayed.

(Example of Configuration of Second Embodiment of Encoding Apparatus)

Figure 21:
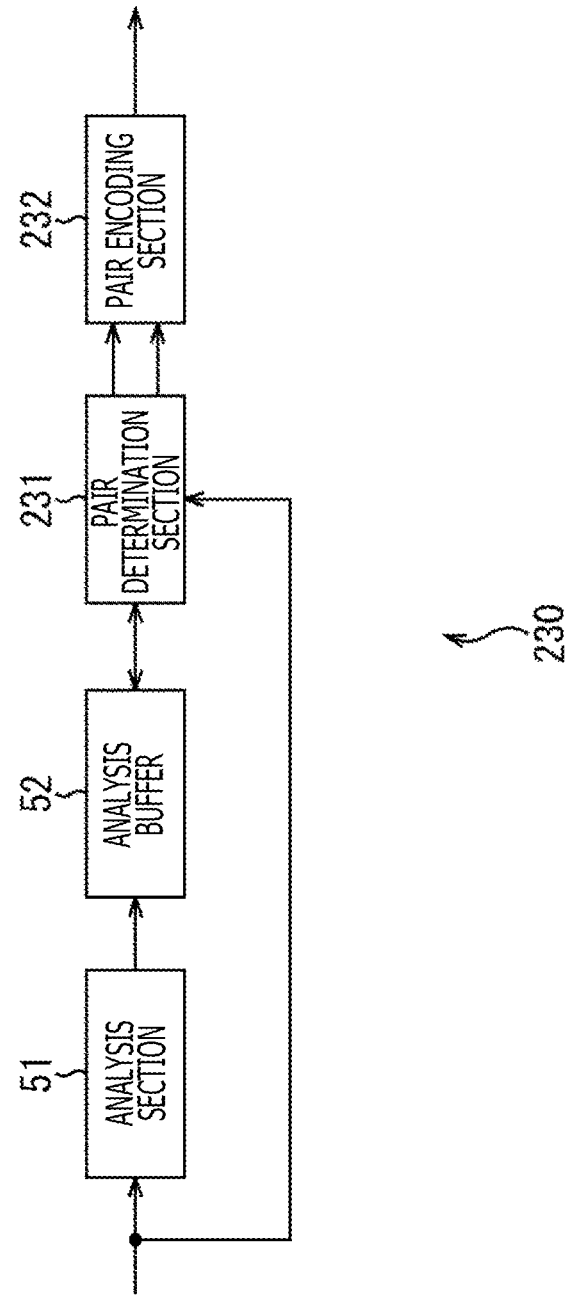
FIG. 21 is a block diagram depicting an example of a configuration of the second embodiment of the encoding apparatus to which the present disclosure is applied.

FIG. 21 is a block diagram depicting an example of a configuration of the second embodiment of an encoding apparatus to which the present disclosure is applied.

Of components depicted in FIG. 21, components same as those in FIG. 2 are denoted by the same reference signs. Overlapping description is omitted suitably.

The configuration of an encoding apparatus 230 of FIG. 21 is different from the configuration of the encoding apparatus 50 of FIG. 2 in that it includes a pair determination section 231 and a pair encoding section 232 in place of the determination section 53, non-division encoding section 54 and division encoding section 55.

The pair determination section 231 reads out an analysis table from the analysis buffer 52. The pair determination section 231 determines, on the basis of the analysis table, a non-division encoded AU or the last division AU and an AU other than the last division AU in division encoding as a pair of AUs of an encoding target.

However, in the case where an analysis table of an AU, which is not encoded as yet, other than the last division AU in division encoding does not exist in the analysis tables stored in the analysis buffer 52, the pair determination section 231 determines only a non-division encoded AU or the last division AU as a pair of AUs of an encoding target.

The pair determination section 231 supplies the analysis table of the pair of AUs of the encoding target and images corresponding to the AUs that configure the pair to the pair encoding section 232. Further, the pair determination section 231 changes coded_flag of the analysis tables, stored in the analysis section 51, of the AUs configuring the pair of AUs of the encoding target to 1.

The pair encoding section 232 generates a synthesis image on the basis of the analysis table of the pair of AUs of the encoding target and the images supplied from the pair determination section 231. The pair encoding section 232 encodes the synthesis image as one AU by the HEVC method to generate an encoded stream of a unit of an AU. The pair encoding section 232 outputs the generated encoded stream of a unit of an AU.

(Example of Configuration of Pair Encoding Section)

Figure 22:
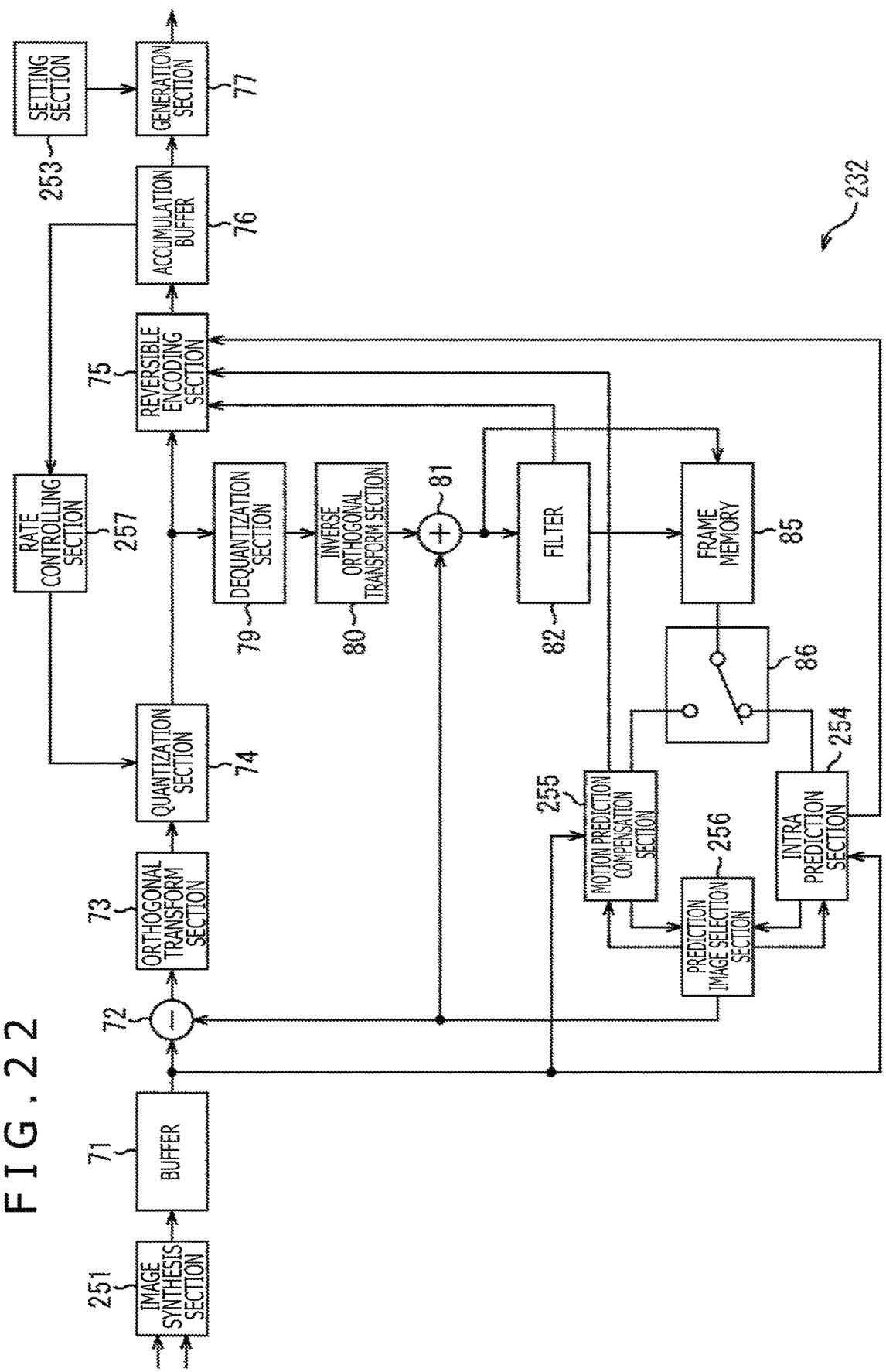
FIG. 22 is a block diagram depicting an example of a configuration of a pair encoding section of FIG. 21.

FIG. 22 is a block diagram depicting an example of a configuration of the pair encoding section 232 of FIG. 21.

Of components depicted in FIG. 22, components same as those of FIG. 5 are denoted by the same reference signs. Overlapping description is omitted suitably.

The configuration of the pair encoding section 232 of FIG. 22 is different from the configuration of the non-division encoding section 54 of FIG. 5 in that an image synthesis section 251 is provided newly and that a setting section 253, an intra prediction section 254, a motion prediction compensation section 255, a prediction image selection section 256 and a rate controlling section 257 are provided in place of the setting section 78, intra prediction section 87, motion prediction compensation section 88, prediction image selection section 89 and rate controlling section 90.

The image synthesis section 251 decides on the basis of an analysis table supplied from the pair determination section 231 of FIG. 21 whether or not one of the pair of AUs of an encoding target is an AU other than the last division AU in division encoding. In the case where the image synthesis section 251 decides that one of the pair of AUs of the encoding target is an AU other than the last division AU in division encoding, it generates a division image from an image corresponding to the AU similarly to the image changing section 110 of FIG. 6. Then, the image synthesis section 251 (image changing section) synthesizes the division image to a lower portion of an image corresponding to the other of the pair of AUs of the encoding target to generate a synthesis image.

On the other hand, in the case where the pair of AUs of the encoding target includes only a non-division encoded AU or the last division AU, the image synthesis section 251 synthesizes a black image (predetermined image) to a lower portion of an image corresponding to the non-division encoded AU or the last division AU to generate a synthesis image. The image synthesis section 251 supplies the synthesis image to the buffer 71.

The setting section 253 sets an SPS in which VUI (Video usability information) including information for designating an upper half region as the display region for a decoded image is disposed. In particular, the setting section 253 sets default_display_window_flag indicative of whether or not a display region is to be designated to 1 indicating that a display region is to be designated.

Further, the setting section 253 sets def_disp_win_bottom_offset indicative of the number of pixels from a lower end of a decoded image to a lower end of the display region to a value indicating the number of pixels equal to one half the number of pixels of the decoded image in the vertical direction.

Furthermore, the setting section 253 sets def_disp_win_top_offset indicative of the number of pixels from an upper end of the decoded image to an upper end of the display region, def_disp_win_left_offset indicative of the number of pixels from the left end of the decoded image to the left end of the display region and def_disp_win_right_offset indicative of the number of pixels from the right end of the decoded image to the right end of the display region to 0.

def_disp_win_bottom_offset, def_disp_win_top_offset, def_disp_win_left_offset and def_disp_win_right_offset set in such a manner as described above are information that designates, as a display region, an image of an upper half corresponding to a non-division encoded AU and the last division AU from within the decoded image. In particular, such information as just described is non-display information indicating that an image corresponding to an AU other than the last division AU in division encoding from within the decoded image is not to be displayed and is display information indicating that an image corresponding to the non-division encoded AU and the last division AU is to be displayed.

The setting section 253 sets an SPS in which VUI including default_display_window_flag, def_disp_win_bottom_offset, def_disp_win_top_offset, def_disp_win_left_offset and def_disp_win_right_offset is disposed.

It is to be noted that, since VUI is disposed in an SPS, vui_parametrs_present_flag disposed in the SPS and indicative of whether or not VUI exists is set to 1 indicating that VUI exists. Further, the setting section 253 sets some other parameter set such as a PPS or the like as occasion demands.

Furthermore, the setting section 253 sets a slice header in a unit of a slice. The setting section 253 encodes the set slice header and parameter sets such as the SPS, PPS and so forth as a header part and supplies the encoded header part to the generation section 77.

The intra prediction section 254 performs a process similar to that of the intra prediction section 87 of FIG. 5 for the image corresponding to the non-division encoded AU and the black image in the synthesis image supplied from the buffer 71 and performs a process similar to that of the intra prediction section 127 of FIG. 6 for the division encoded AU.

The motion prediction compensation section 255 performs a process similar to that of the motion prediction compensation section 88 of FIG. 5 for the image corresponding to the non-division encoded AU and the black image from within the synthesis image supplied from the buffer 71, and performs a process similar to that of the motion prediction compensation section 128 of FIG. 6 for the division encoded AU.

The prediction image selection section 256 performs a process similar to that of the prediction image selection section 89 of FIG. 5 for the image corresponding to the non-division encoded AU and the black image in the synthesis image and performs a process similar to that of the prediction image selection section 129 of FIG. 6 for the division encoded AU.

(Description of Processing of Encoding Apparatus)

Figure 23:
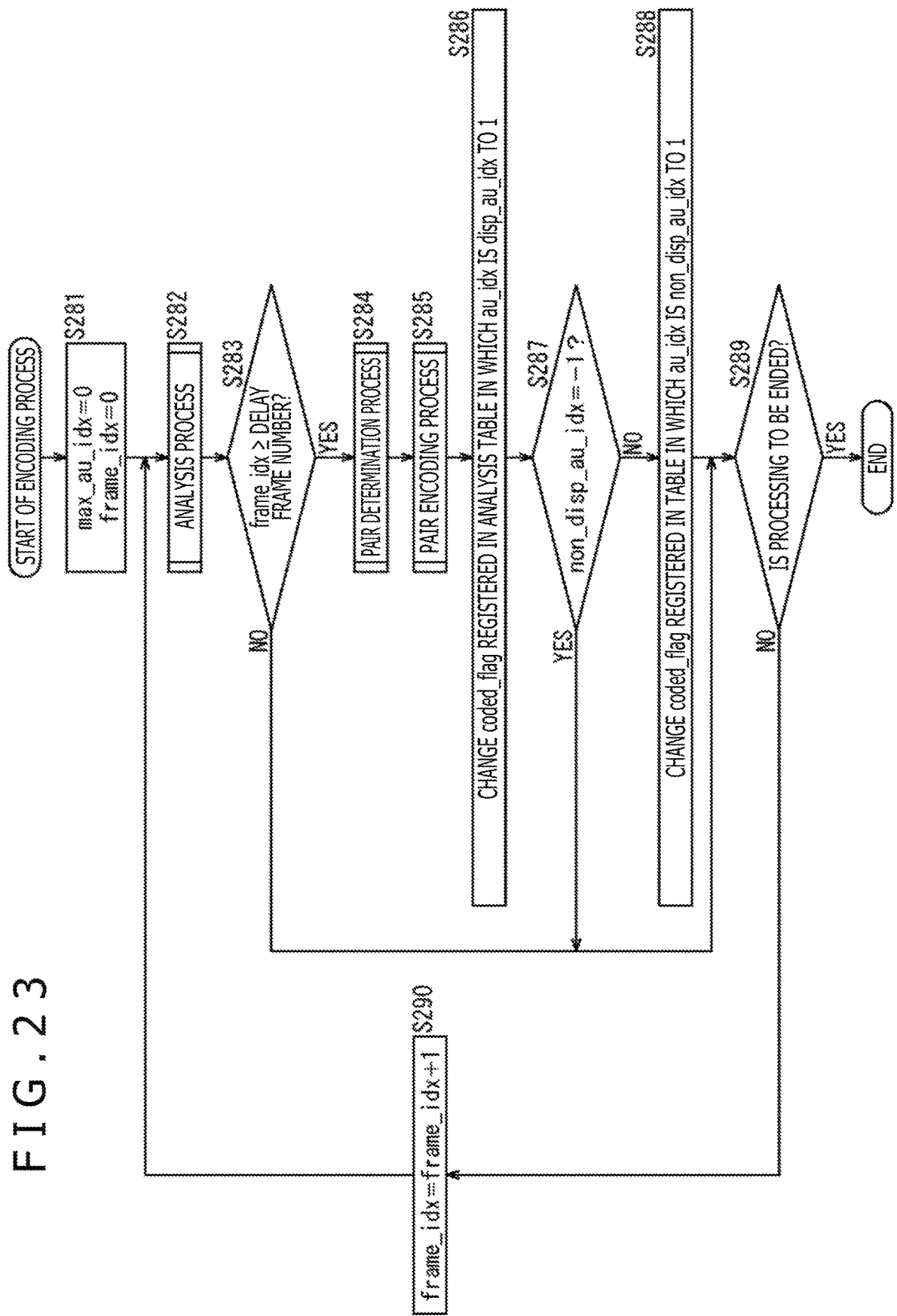
FIG. 23 is a flow chart illustrating an encoding process of the encoding apparatus of FIG. 21.

FIG. 23 is a flow chart illustrating an encoding process of the encoding apparatus 230 of FIG. 21.

At step S281 of FIG. 23, the analysis section 51 of the encoding apparatus 230 sets max_au_idx and frame_idx to 0. At step S282, the analysis section 51 performs the analysis process of FIG. 8.

At step S283, the determination section 53 decides whether or not frame_idx is equal or greater than a delay frame number. In the case where it is decided at step S283 that frame_idx is equal to or greater than the delay frame number, the pair determination section 231 performs a pair determination process for determining a pair of AUs of an encoding target at step S284. Details of the pair determination process are hereinafter described with reference to FIG. 24.

At step S285, the pair encoding section 232 performs a pair encoding process for encoding the pair of AUs of the encoding target. Details of the pair encoding process are hereinafter described with reference to FIG. 25.

At step S286, the pair determination section 231 changes coded_flag registered in an analysis table that is stored in the analysis buffer 52 and in which au_idx is disp_au_idx set by the pair determination process at step S284, namely, an analysis table of an AU corresponding to a display region from within the pair of AUs of the encoding target, to 1. Then, the processing advances to step S287.

At step S287, the pair determination section 231 decides whether or not non_disp_au_idx set by the pair determination process at step S284 is −1. In the case where it is decided at step S287 that non_disp_au_idx is not −1, namely, in the case where an AU corresponding to a non-display region exists in the pair of AUs of the encoding target, the processing advances to step S288.

At step S288, the pair determination section 231 changes coded_flag registered in the analysis table that is stored in the analysis buffer 52 and in which au_idx is non_disp_au_idx, namely, an analysis table of an AU corresponding to a non-display region in the pair of AUs of the encoding target, to 1. Then, the processing advances to step S289.

On the other hand, in the case where non_disp_au_idx is −1 at step S287, namely, in the case where an AU corresponding to a non-display region does not exist in the pair of AUs of the encoding target, the processing advances to step S289.

On the other hand, in the case where it is decided at step S283 that frame_idx is not equal to or greater than the delay frame number, the processing advances to step S289. Since the processes at steps S289 and S290 are similar to the processes at steps S19 and S20 of FIG. 7, description of them is omitted.

Figure 24:
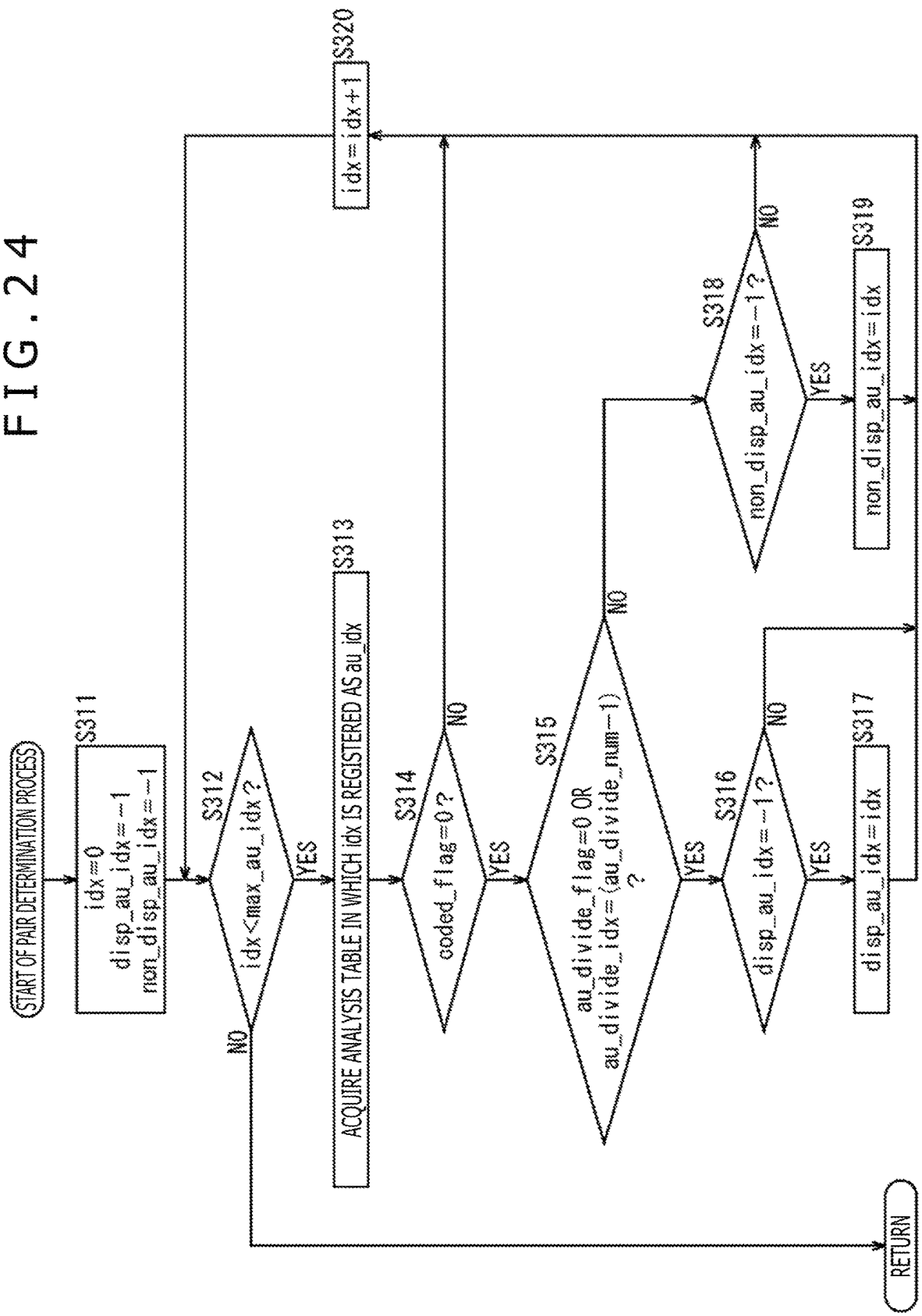
FIG. 24 is a flow chart illustrating a pair determination process of FIG. 23.

FIG. 24 is a flow chart illustrating the pair determination process at step S284 of FIG. 23.

At step S311 of FIG. 24, the pair determination section 231 sets idx to 0. Further, the pair determination section 231 sets disp_au_idx indicative of au_idx of the AU corresponding to the display region and non_disp_au_idx indicative of au_idx of the AU corresponding to the non-display region to −1 indicating that it is not determined as yet.

Processes at steps S312 to S314 are similar to the processes at steps S62 to S64 of FIG. 9, and therefore, description of them is omitted.

At step S315, the pair determination section 231 decides whether or not au_divide_flag registered in the analysis table acquired at step S313 is 0 or au_divide_idx is au_divide_num−1. In the case where it is decided at step S315 that au_divide_flag is 0 or au_divide_idx is au_divide_num−1, namely, in the case where the AU of the processing target is a non-division encoded AU or the last division AU, the processing advances to step S316.

At step S316, the pair determination section 231 decides whether or not disp_au_idx is −1. In the case where disp_au_idx is −1 at step S316, namely, in the case a non-division encoded AU or the last division AU that is not encoded is found for the first time, the processing advances to step S317.

At step S317, the pair determination section 231 determines the AU of the processing target as one of the pair of AUs of the encoding target and set disp_au_idx to idx, whereafter it advances the processing to step S320.

On the other hand, in the case where it is decided at step S316 that disp_au_idx is −1, namely, in the case where a non-division encoded AU or the last division AU that is not encoded as yet is found out already, the processing advances to step S320.

On the other hand, in the case where it is decided at step S315 that au_divide_flag is not 0 and besides au_divide_idx is not au_divide_num−1, namely, in the case where the AU of the encoding target is an AU other than the last division AU in division encoding, the processing advances to step S318.

At step S318, the pair determination section 231 decides whether or not non_disp_au_idx is −1. In the case where non_disp_au_idx is −1 at step S318, namely, in the case where an AU, which is not encoded, other than the last division AU in division encoding is found out for the first time, the processing advances to step S319.

At step S319, the pair determination section 231 determines the AU of the processing target as one of the pair of AUs of the encoding target and sets non_disp_au_idx to idx, whereafter it advances the processing to step S320.

On the other hand, in the case where it is decided at step S318 that non_disp_au_idx is not −1, namely, in the case where an AU, which is not encoded, other than the last division AU in division encoding is found already, the processing advances to step S320.

At step S320, the pair determination section 231 increments idx by 1 and returns the processing to step S312. Then, until after idx becomes equal to or greater than max_au_idx, namely, until after detection of a pair of a non-division encoded AU or the last division AU, which is not encoded as yet, and an AU other than the last division AU in division encoding, is performed on the AUs corresponding to all analysis tables stored in the analysis buffer 52, the processes at steps S312 to S320 are repeated.

Consequently, a pair of a non-division encoded AU having minimum au_idx or the last division AU, which is not encoded as yet, and an AU other than the last division AU in division encoding, is detected. However, also there is a case in which an AU other than the last division AU in division encoding is not detected. In this case, non_disp_au_idx remains −1.

On the other hand, in the case where it is decided at step S312 that idx is equal to or greater than max_au_idx, the pair determination section 231 supplies an analysis table whose au_idx is disp_au_idx and non_disp_au_idx and an image corresponding to the analysis table to the pair encoding section 232. It is to be noted that, in the case where an analysis table in which non_disp_au_idx is −1 and au_idx is non_disp_au_idx does not exist, only an analysis table in which au_idx is disp_au_idx and an image corresponding to the analysis table are supplied to the pair encoding section 232. Then, the processing returns to step S284 of FIG. 23 and then advances to step S285.

Figure 25:
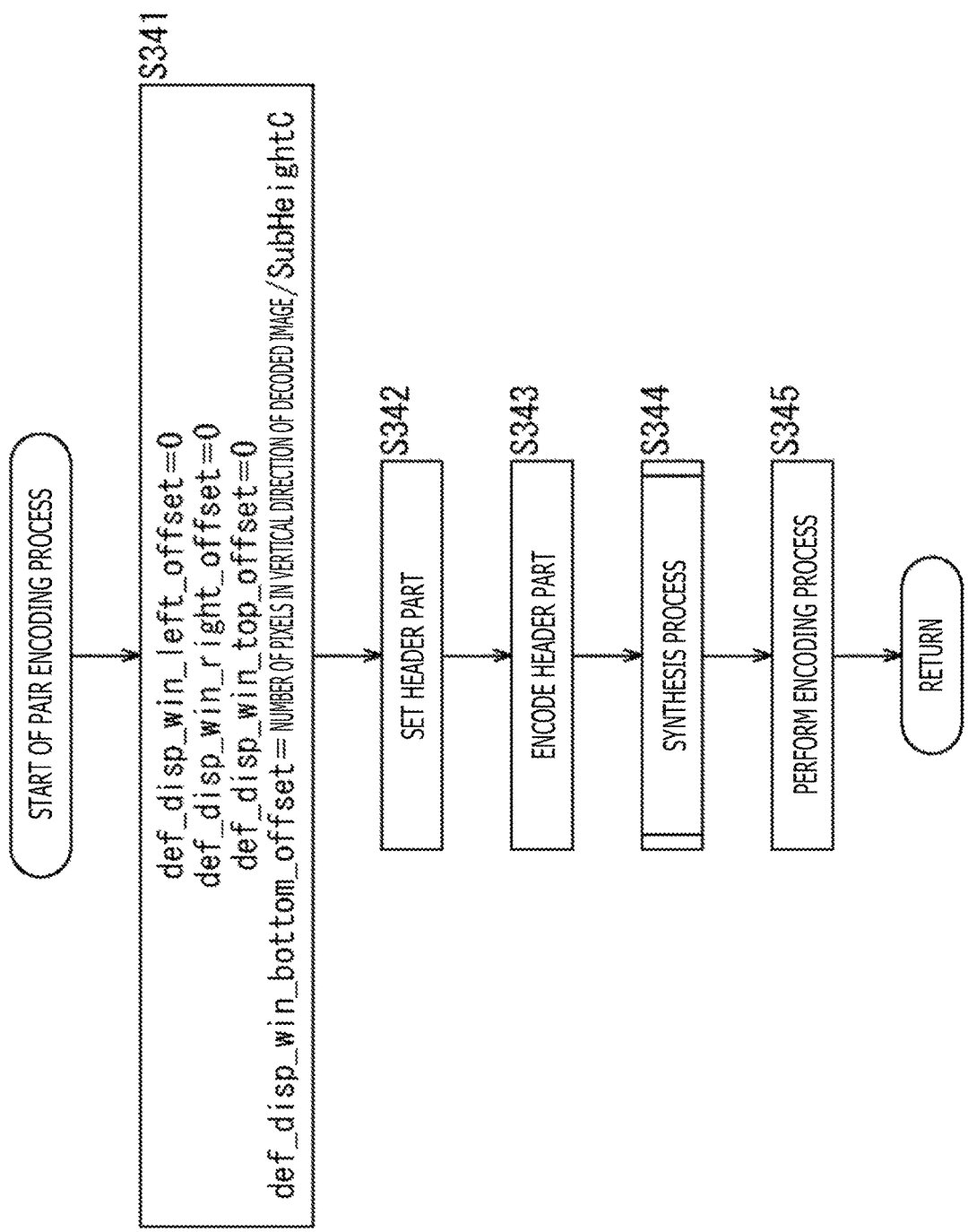
FIG. 25 is a flow chart illustrating a pair encoding process of FIG. 23.

FIG. 25 is a flow chart illustrating the pair encoding process at step S285 of FIG. 23.

At step S341 of FIG. 25, the setting section 253 of the pair encoding section 232 (FIG. 22) sets def_disp_win_left_offset, def_disp_win_right_offset and def_disp_win_top_offset to 0 and sets def_disp_win_bottom_offset to a value obtained by dividing the number of pixels in the vertical direction of the decoded image by SubHeightC. SubHeightC is a parameter defined by the HEVC method in order to indicate the number of pixels in the vertical direction by a value of 1/SubHeightC time. Accordingly, upon decoding, a value obtained by multiplying def_disp_win_bottom_offset by SubHeightC is the number of pixels from the lower end of the decoded image to the lower end of the display region.

At step S342, the setting section 253 sets def_disp_win_bottom_offset, def_disp_win_top_offset, def_disp_win_left_offset and def_disp_win_right_offset set at step S341, an SPS in which VUI including 1 as default_display_window_flag is disposed and a slice header as a header part. Further, the setting section 253 sets also other parameter sets such as the PPS and so forth as the header part as occasion demands.

At step S343, the setting section 253 encodes the header part. At step S344, the image synthesis section 251 performs a synthesis process for synthesizing images corresponding to the pair of AUs of the encoding target. Details of the synthesis process are hereinafter described with reference to FIG. 26.

At step S345, the pair encoding section 232 encodes the synthesis image generated by the synthesis process at step S344 and returns the processing to step S285 of FIG. 23 and then advances the processing to step S286.

Figure 26:
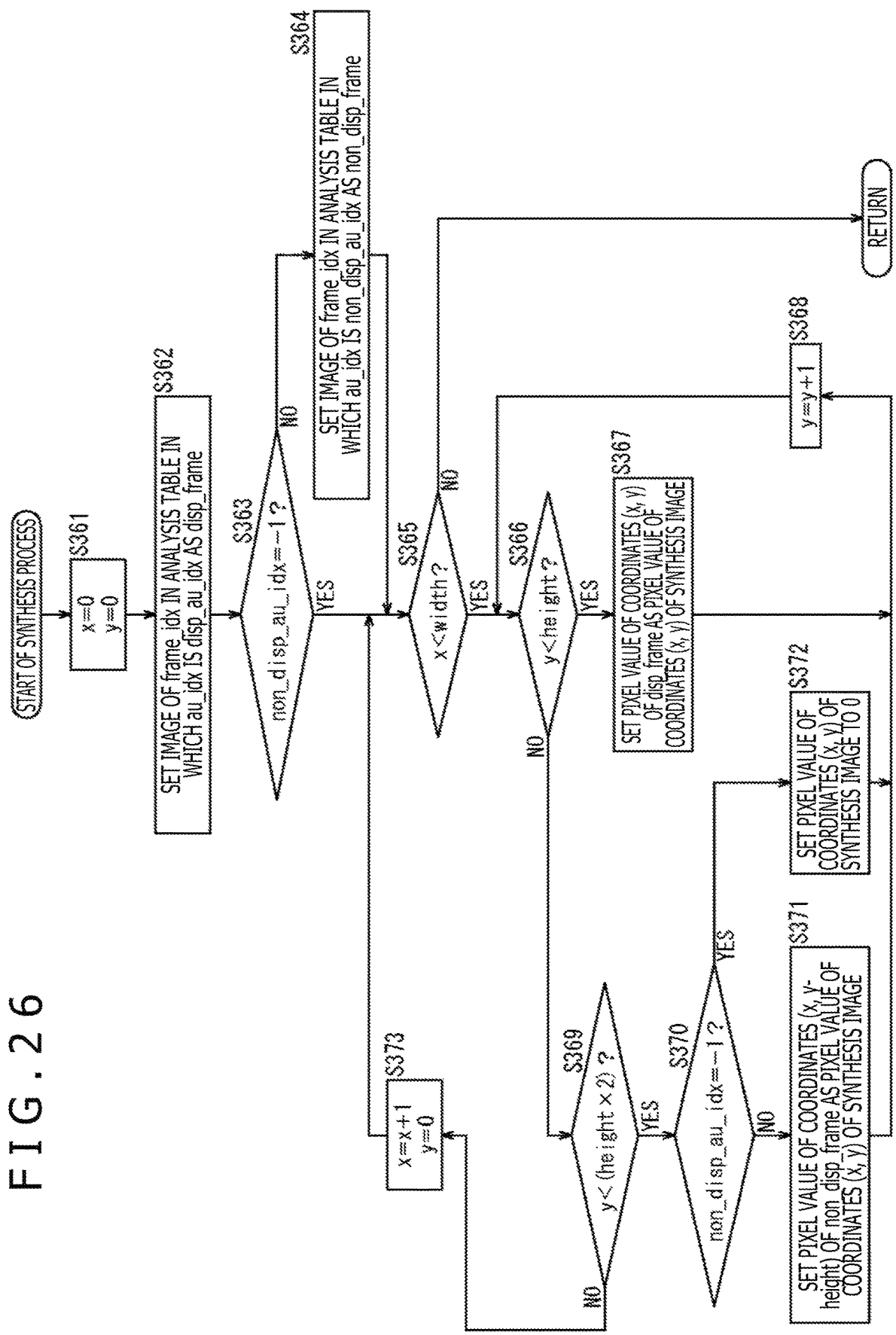
FIG. 26 is a flow chart illustrating a synthesis process of FIG. 25.

FIG. 26 is a flow chart illustrating the synthesis process at step S344 of FIG. 25.

At step S361 of FIG. 26, the image synthesis section 251 sets the coordinate x and the coordinate y to 0. At step S362, the image synthesis section 251 sets an image corresponding to the non-division encoded AU or the last division AU, which is supplied from the pair determination section 231 and is identified by frame_idx registered in an analysis table whose au_idx is disp_au_idx as disp_frame.

At step S363, the image synthesis section 251 decides whether or not non_disp_au_idx set by the pair determination section 231 is −1. In the case where it is decided at step S363 that non_disp_au_idx is not −1, namely, in the case where an image of an AU that configures a pair with the AU corresponding to disp_frame is supplied from the pair determination section 231, the processing advances to step S364.

At step S364, the image synthesis section 251 sets an image of an encoding target corresponding to an AU other than the last division AU in division encoding, which is supplied from the pair determination section 231 and is identified by frame_idx registered in an analysis table whose au_idx is non_disp_au_idx as non_disp_frame. Then, the processing advances to step S365.

On the other hand, in the case where it is decided at step S362 that non_disp_au_idx is −1, namely, in the case where only disp_frame is supplied from the pair determination section 231, the processing advances to step S365.

At step S365, the image synthesis section 251 decides whether or not the coordinate x is smaller than the pixel number width in the horizontal direction of the image of the encoding target. In the case where it is decided at step S365 that the coordinate x is smaller than the pixel number width in the horizontal direction of the image of the encoding target, namely, in the case where the coordinate x is the x coordinate of pixels in a column in the synthesis image to be generated, the processing advances to step S366.

At step S366, the image synthesis section 251 decides whether or not the coordinate y is smaller than the pixel number height in the vertical direction of the image of the encoding target. In the case where it is decided at step S366 that the coordinate y is smaller than the pixel number height in the vertical direction of the image of the encoding target, namely, in the case where the coordinate y is the y coordinate of pixels in a row in an upper half in the synthesis image to be generated, the processing advances to step S367.

At step S367, the image synthesis section 251 sets the pixel value of the coordinates (x, y) of disp_frame to the pixel value of the coordinates (x, y) of the synthesis image to be generated. At step S368, the image synthesis section 251 increments the coordinate y by 1 and returns the processing to step S366. Then, the processes at steps S366 to S368 are repeated until after the coordinate y becomes equal to or greater than the pixel number height in the vertical reaction of the image of the encoding target, namely, until after the coordinate y represents the y coordinate of pixels in a lowermost row in the upper half in the synthesis image to be generated. Consequently, pixel values of the pixels in the upper half in the column of the coordinate x of the synthesis image become same as pixel values of disp_frame at the positions same as those of the pixels.

On the other hand, in the case where it is decided at step S366 that the coordinate y is equal to or greater than the pixel number height in the vertical direction of the image of the encoding target, namely, in the case where the coordinate y is the y coordinate of pixels in a row below the upper half in the synthesis image to be generated, the processing advances to step S369.

At step S369, the image synthesis section 251 decides whether or not the coordinate y is smaller than twice the pixel number height in the vertical direction of the image of the encoding target. In the case where it is decided at step S369 that the coordinate y is smaller than twice the pixel number height in the vertical direction of the image of the encoding target, namely, in the case where the coordinate y is the y coordinate of pixels in a lower half in the synthesis image to be generated, the processing advances to step S370.

At step S370, the image synthesis section 251 decides whether or not non_disp_au_idx is −1. In the case where it is decided at step S370 that non_disp_au_idx is not −1, namely, in the case where an image of the AU configuring a pair with the AU corresponding to disp_frame is supplied from the pair determination section 231, the processing advances to step S371.

At step S371, the image synthesis section 251 sets the pixel value at the coordinates (x, y-height) of non_disp_frame as the pixel value of the coordinates (x, y) of the synthesis image to be generated.

On the other hand, in the case where it is decided at step S370 that non_disp_au_idx is −1, namely, in the case where only disp_frame is supplied from the pair determination section 231, the processing advances to step S372. At step S372, the image synthesis section 251 sets the pixel value at the coordinates (x, y) of the synthesis image to be generated to 0.

After the process at step S371 or S372, the processing advances to step S368, at which the coordinate y is incremented by 1, whereafter the processing returns to step S366. Then, the processes at steps S366 and S368 to S372 are repeated until after it is decided that the coordinate y is equal to or greater than twice the pixel number height in the vertical direction of the image of the encoding target, namely, until after the coordinate y represents the y coordinate of pixels of the lowermost row in the synthesis image to be generated. Consequently, the pixel value of each pixel in the lower half of the column of the coordinate x of the synthesis image becomes the pixel value of the pixel of non_disp_frame at the position higher by height from the pixel or 0.

On the other hand, in the case where it is decided at step S369 that the coordinate y is equal to or greater than twice the pixel number height in the vertical direction of the image of the encoding target, namely, in the case where the coordinate y represents the y coordinate of pixels in the lowermost row in the synthesis image to be generated, the processing advances to step S373.

At step S373, the image synthesis section 251 increments the coordinate x by 1 and returns the coordinate y to 0. Then, the processing returns to step S365, and the processes at steps S365 to S373 are repeated until after the coordinate x becomes equal to or greater than the pixel number width in the horizontal direction of the image of the encoding target, namely, until after the coordinate x represents the x coordinate of pixels in the rightmost column in the synthesis image to be generated. Consequently, a synthesis image is generated in which the upper half is disp_frame and the lower half is non_disp_frame or a black image.

In the case where it is decided at step S365 that the coordinate x is equal to or greater than the pixel number width in the horizontal direction of the image of the encoding target, namely, in the case where the coordinate x represents the x coordinate of pixels in the rightmost column in the synthesis image to be generated, the processing returns to step S344 of FIG. 25 and then advances to step S345.

It is to be noted that, while, in the description given above, to a lower portion of an image corresponding to a non-division encoded AU or the last division AU, an image corresponding to an AU other than the last division AU in division encoding or a black image is synthesized, the synthesis position is not limited to a lower portion.

Figure 27:
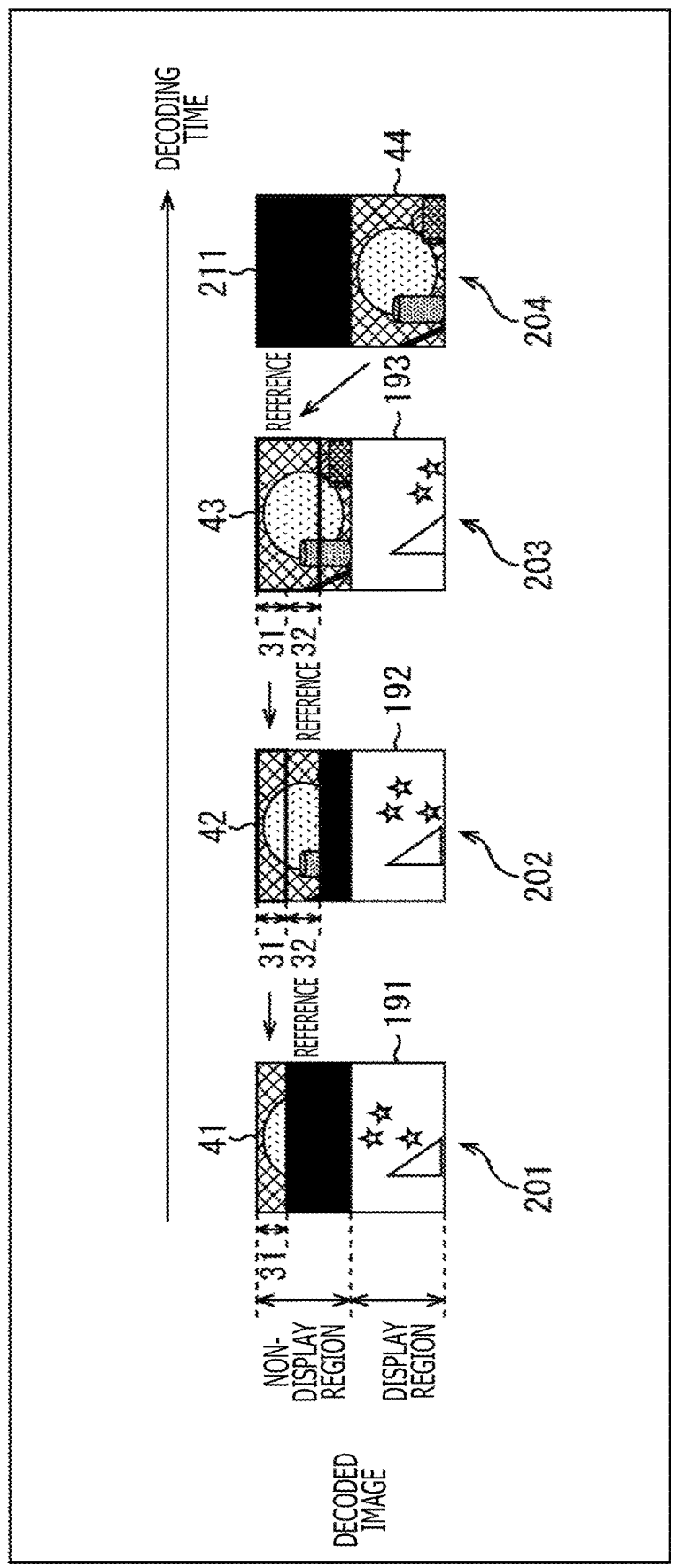
FIG. 27 is a view illustrating a different first synthesis method.

For example, to an upper portion of an image corresponding to a non-division encoded AU or the last division AU, an image corresponding to an AU other than the last division AU in division encoding or a black image may be synthesized as depicted in FIG. 27.

In this case, the upper half of a decoded image is designated as a non-display region while the lower half is designated as a display region. In particular, def_disp_win_top_offset is set to a value obtained by dividing the number of pixels in the vertical direction of a decoded image by SubHeightC. Further, def_disp_win_bottom_offset, def_disp_win_left_offset and def_disp_win_right_offset are set to 0.

Figure 28:
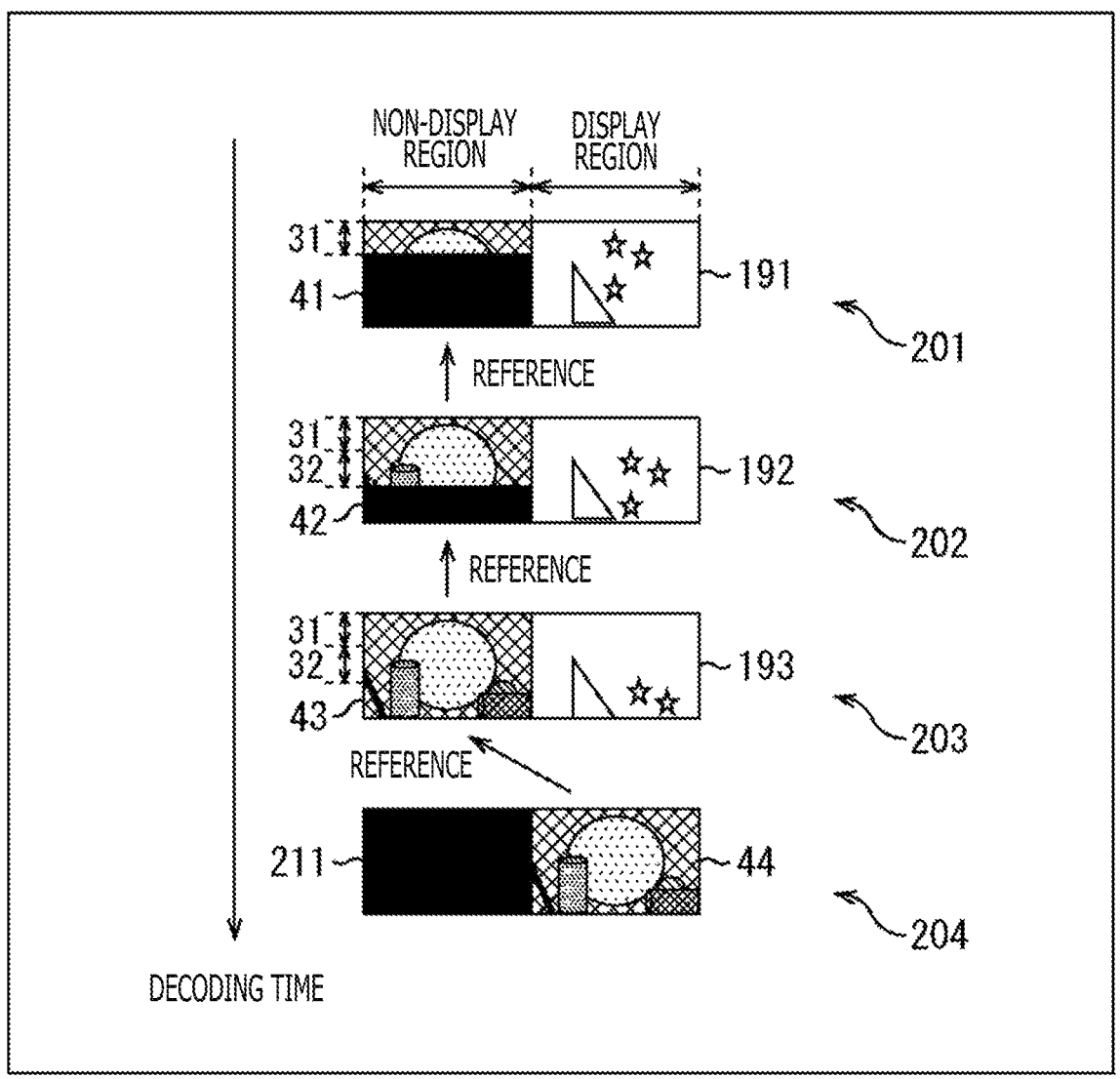
FIG. 28 is a view illustrating a different second synthesis method.

Further, to the left side of an image corresponding to a non-division encoded AU or the last division AU, an image corresponding to an AU other than the last division AU in division encoding or a black image may be synthesized as depicted in FIG. 28.

In this case, the left half of a decoded image is designated as a non-display region while the right half is designated as a display region. In particular, def_disp_win_left_offset is set to a value obtained by dividing the number of pixels in the horizontal direction of a decoded image by SubWidthC. Further, def_disp_win_bottom_offset, def_disp_win_top_offset and def_disp_win_right_offset are set to 0. It is to be noted that SubWidthC is a parameter defined by the HEVC method in order to indicate the number of pixels in the horizontal direction in a value equal to 1/SubWidthC time.

Figure 29:
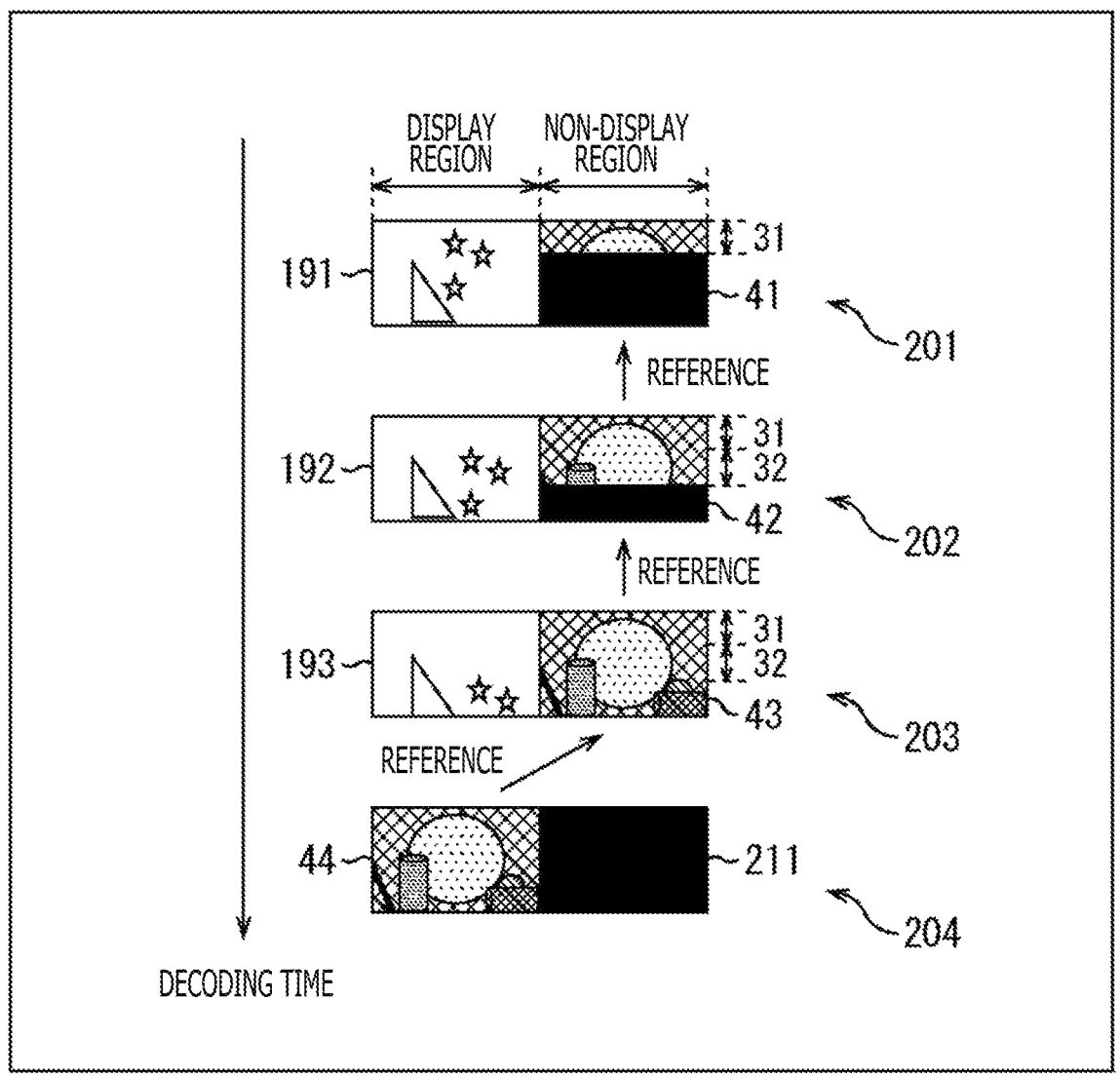
FIG. 29 is a view illustrating a different third synthesis method.

Furthermore, to the right side of an image corresponding to a non-division encoded AU or the last division AU, an image corresponding to an AU other than the last division AU in division encoding or a black image may be synthesized as depicted in FIG. 29.

In this case, the left half of a decoded image is designated as a display region while the right half is designated as a non-display region. In particular, def_disp_win_right_offset is set to a value obtained by dividing the number of pixels in the horizontal direction of a decoded image by SubWidthC. Further, def_disp_win_bottom_offset, def_disp_win_top_offset and def_disp_win_left_offset are set to 0.

It is to be noted that, though not depicted, the configuration of a decoding apparatus in the second embodiment is same as the configuration of FIG. 16 except that the decoding section 152 supplies only the display region designated by def_disp_win_top_offset, def_disp_win_bottom_offset, def_disp_win_left_offset and def_disp_win_right_offset in a decoded image to the display section 153.

In particular, in the decoding apparatus of the second embodiment, the screen image sorting buffer 179 stores only a display region designated by def_disp_win_top_offset, def_disp_win_bottom_offset, def_disp_win_left_offset and def_disp_win_right_offset in an image supplied from the filter 176 in a unit of a frame.

It is to be noted that, while, in the second embodiment, the encoding method is the HEVC method, also it is possible to use the AVC method as the encoding method. In this case, default_display_window_flag, def_disp_win_top_offset, def_disp_win_bottom_offset, def_disp_win_left_offset, def_disp_win_right_offset, SubWidthC and SubHeightC are replaced by frame_cropping_flag, frame_crop_top_offset, frame_crop_bottom_offset, frame_crop_left_offset, frame_crop_right_offset, CropUnitX and CropUnitY. Further, for reversible encoding, not only arithmetic encoding (for example, CABAC (Context-Adaptive Binary Arithmetic Coding) or the like) but also variable length encoding (for example, CAVLC (Context-Adaptive Variable Length Coding) or the like) can be used.

Third Embodiment (Description of Computer to which Present Disclosure is Applied)

While the series of processes described above can be executed by hardware, it may otherwise be executed by software. Where the series of processes is executed by software, a program that constructs the software is installed into a computer. Here, the computer includes a computer incorporated in hardware for exclusive use, for example, a personal computer for universal use that can execute various functions by installing various programs, and so forth.

FIG. 30 is a block diagram depicting an example of a configuration of hardware of a computer that executes the series of processes described hereinabove in accordance with a program.

In a computer 900, a CPU (Central Processing Unit) 901, a ROM (Read Only Memory) 902 and a RAM (Random Access Memory) 903 are connected to each other by a bus 904.

To the bus 904, an input/output interface 905 is connected further. To the input/output interface 905, an inputting section 906, an outputting section 907, a storage section 908, a communication section 909 and a drive 910 are connected.

The inputting section 906 includes a keyboard, a mouse, a microphone and so forth. The outputting section 907 includes a display, a speaker and so forth. The storage section 908 includes a hard disk, a nonvolatile memory and so forth. The communication section 909 includes a network interface and so forth. The drive 910 drives a removable medium 911 such as a magnetic disk, an optical disk, a magneto-optical disk or a semiconductor memory.

In the computer 900 configured in such a manner as described above, the CPU 901 loads a program stored, for example, in the storage section 908 into the RAM 903 through the input/output interface 905 and the bus 904 and executes the program to perform the series of processes described hereinabove.

The program executed by the computer 900 (CPU 901) can be recorded on and provided as the removable medium 911, for example, as a package medium or the like. Further, the program can be provided through a wired or wireless transmission medium such as a local area network, the Internet or a digital satellite broadcast.

In the computer 900, the program can be installed into the storage section 908 through the input/output interface 905 by loading the removable medium 911 into the drive 910. Further, the program can be received by the communication section 909 through a wired or wireless transmission medium and installed into the storage section 908. Furthermore, it is possible to install the program in advance into the ROM 902 or the storage section 908.

It is to be noted that the program executed by the computer 900 may be a program by which processes are performed in a time series in accordance with the order described in the present specification or a program in which processes are performed in parallel or are performed at a timing at which the program is called or the like.

Further, the effects described in the present specification are exemplary to the last and shall not be restrictive, and other effects may be available.

Furthermore, the embodiment of the present disclosure is not limited to the embodiments described hereinabove and can be altered in various manners without departing from the subject matter of the present disclosure.

For example, in the case where the picture type of an image of an encoding target is an I picture that generally has a large bit generation amount, division encoding may be performed.

Further, the number of AUs in division encoding may be equal to the number of division regions. In this case, encoding having different quantization bit rates is not performed.

It is to be noted that the present disclosure can have such configurations as described below.

(1)

An encoding apparatus, including:

an encoding section configured to divide an image into a plurality of access units and encode the plurality of access units to generate encoded streams of the plurality of access units; and a setting section configured to set non-display information indicating that a decoded image obtained by decoding an encoded stream of an access unit other than a last access unit from among the encoded streams of the plurality of access units generated by the encoding section is not to be displayed.

(2)

The encoding apparatus according to (1) above, in which the encoding section is configured such that, where a difference between the image and a previous image one time before the image is greater than a threshold value, the encoding section divides the image into the plurality of access units and then encodes the plurality of access units.

(3)

The encoding apparatus according to (1) above, in which the encoding section is configured such that, where a picture type of the image is an I picture, the encoding section divides the image into the plurality of access units and encodes the plurality of access units.

(4)

The encoding apparatus according to any one of (1) to (3) above, further including:

an image changing section configured to divide the image into a plurality of division regions and generate a plurality of division images including the respective division regions, in which the encoding section is configured such that the encoding section encodes the division images generated by the image changing section as access units.

(5)

The encoding apparatus according to (4) above, in which the encoding section is configured such that the encoding section intra encodes a first one of the plurality of division images.

(6)

The encoding apparatus according to (5) above, in which the image changing section is configured such that the image changing section sets pixel values in a region other than the division region that configures the first division image to a fixed value.

(7)

The encoding apparatus according to (6) above, in which the encoding section is configured such that the encoding section encodes a region other than the division regions in the division images other than the first division image from among the plurality of division images in a skip mode.

(8)

The encoding apparatus according to (7) above, in which the encoding section is configured such that the encoding section refers to the decoded image obtained by decoding the encoded stream of a last division image from among the plurality of division images to encode the image as the last access unit.

(9)

The encoding apparatus according to any one of (4) to (8) above, in which the image changing section synthesizes a division image corresponding to an access unit other than the last access unit and a different image to generate a synthesis image, the encoding section encodes the synthesis image generated by the image changing section as an access unit, and the non-display information is configured such that the non-display information indicates that the division image from within the synthesis image obtained by decoding an encoded stream of an access unit other than the last access unit is not to be displayed.

(10)

The encoding apparatus according to (9) above, in which the non-display information is configured such that the non-display information is information that designates, from within the synthesis image obtained by decoding an encoded stream of an access unit other than the last access unit, a region other than a region of the division image as a display region.

(11)

The encoding apparatus according to (9) or (10) above, in which the image changing section synthesizes the image and a division image of a different image or a given image to generate a synthesis image corresponding to a last access unit, the encoding section encodes the synthesis image corresponding to the last access unit generated by the image changing section as the last access unit, and the setting section is configured such that the setting section sets display information that designates, from within the synthesis image obtained by decoding an encoded stream of the last access unit, a region of the image as a display region.

(12))

The encoding apparatus according to any one of (1) to (8) above, in which the setting section is configured such that the setting section sets display information indicating that a decoded image obtained by decoding an encoded stream of the last access unit is to be displayed.

(13)

An encoding method for an encoding apparatus, including:

an encoding step of dividing an image into a plurality of access units and encoding the plurality of access units to generate encoded streams of the plurality of access units; and a setting step of setting non-display information indicating that a decoded image obtained by decoding an encoded stream of an access unit other than a last access unit from among the encoded streams of the plurality of access units generated by the process of the encoding step is not to be displayed.

REFERENCE SIGNS LIST

11 to 13 Division image, 24 Image, 41 to 43 Division decoded image, 44 Decoded image, 50 Encoding apparatus, 112 Arithmetic operation section, 118 Setting section, 201 to 204 Synthesis image, 230 Encoding apparatus, 251 Image synthesis section, 253 Setting section

The invention claimed is:

1. An encoding apparatus, comprising:
   circuitry configured to
   divide an image spatially at least into a first non-displayed access unit, an intermediate non-displayed access unit, and a last access unit, wherein
   the first non-displayed access unit includes a first reference region and a first non-reference region,
   the intermediate non-displayed access unit includes an intermediate reference region larger than the first reference region referring to the first reference region but not referring to the first non-reference region, and
   the last access unit refers to the intermediate non-displayed access unit,
   encode the first non-displayed access unit, the intermediate non-displayed access unit, and the last access unit to generate one or more encoded streams indicating the first non-displayed access unit, the intermediate non-displayed access unit, and the last access unit in order, and
   set, to the first non-displayed access unit and the intermediate non-displayed access unit, non-display information indicating that the first non-displayed access unit and the intermediate non-displayed access unit are not displayed when the generated encoded stream is decoded to display a single decoded image corresponding to the last access unit.

2. The encoding apparatus according to claim 1,
   wherein the circuitry is configured to
   determine whether a difference between the image and a previous image one time before the image is greater than a threshold value, and
   perform the division of the image on a basis of the determination that the difference between the image and a previous image one time before the image is greater than the threshold value.

3. The encoding apparatus according to claim 1,
   wherein the circuitry is configured to
   determine whether a picture type of the image is an I picture, and
   perform the division of the image on a basis of the determination that the picture type of the image is the intra picture.

4. The encoding apparatus according to claim 1,
   wherein the circuitry is configured to encode the first non-displayed access unit as a non-displayed intra picture which is encoded before the second non-displayed access unit and the last access unit in the generated decoded stream.

5. The encoding apparatus according to claim 1,
   wherein the circuitry is configured to set a fixed pixel value to the first non-reference region.

6. The encoding apparatus according to claim 1,
   wherein the circuitry is configured to set, to a part of the intermediate reference region, a skip mode to indicate no parameter with respect to the first reference region in the generated encoded stream.

7. The encoding apparatus according to claim 1,
   wherein the circuitry synthesizes a division image corresponding to an access unit other than the last access unit and a different image to generate a synthesis image,
   wherein the circuitry encodes the generated synthesis image as an access unit, and
   wherein the non-display information is configured such that the non-display information indicates that the division image from within the synthesis image obtained by decoding an encoded stream of an access unit other than the last access unit is not to be displayed.

8. The encoding apparatus according to claim 7,
   wherein the non-display information is configured such that the non-display information is information that designates, from within the synthesis image obtained by decoding an encoded stream of an access unit other than the last access unit, a region other than a region of the division image as a display region.

9. The encoding apparatus according to claim 7,
   wherein the circuitry synthesizes the image and a division image of a different image or a given image to generate a synthesis image corresponding to a last access unit,
   wherein the circuitry encodes the generated synthesis image corresponding to the last access unit as the last access unit, and
   wherein the circuitry is configured such that the circuitry sets display information that designates, from within the synthesis image obtained by decoding an encoded stream of the last access unit, a region of the image as a display region.

10. The encoding apparatus according to claim 1,
    wherein the circuitry is configured to set display information indicating that a decoded image obtained by decoding an encoded stream of the last access unit is to be displayed.

11. An encoding method for an encoding apparatus, comprising:
    dividing an image spatially at least into a first non-displayed access unit, an intermediate non-displayed access unit, and a last access unit, wherein
    the first non-displayed access unit includes a first reference region and a first non-reference region,
    the intermediate non-displayed access unit includes an intermediate reference region larger than the first reference region referring to the first reference region but not referring to the first non-reference region, and
    the last access unit refers to the intermediate non-displayed access unit;
    encoding the first non-displayed access unit, the intermediate non-displayed access unit and the last access unit to generate one or more encoded streams indicating the first non-displayed access unit, the intermediate non-displayed access unit, and the last access unit in order; and
    setting, to the first non-displayed access unit and the intermediate non-displayed access unit, non-display information indicating that the first non-displayed access unit and the intermediate non-displayed access unit are not displayed when the generated encoded stream is decoded to display a single decoded image corresponding to the last access unit while other displayed access units of the plurality of spatially divided access units are displayed in an entire displayable area of a screen displaying the decoded image.

12. The encoding apparatus according to claim 2,
    wherein the circuitry is further configured to calculate the difference as a sum of absolute difference in pixel value between pixels at same positions in the image and in the previous image one time before the image.

* * * * *